(12) United States Patent
Matsuzaki et al.

(10) Patent No.: US 8,316,102 B2
(45) Date of Patent: Nov. 20, 2012

(54) RELAY DEVICE

(75) Inventors: Natsume Matsuzaki, Osaka (JP); Kaoru Yokota, Hyogo (JP); Masao Nonaka, Osaka (JP); Shogo Hamasaki, Osaka (JP); Kenji Hisatomi, Osaka (JP)

(73) Assignee: Panasonic Corporation, Osaka (JP)

( * ) Notice: Subject to any disclaimer, the term of this patent is extended or adjusted under 35 U.S.C. 154(b) by 164 days.

(21) Appl. No.: 13/013,180

(22) Filed: Jan. 25, 2011

(65) Prior Publication Data

US 2011/0119458 A1 May 19, 2011

Related U.S. Application Data

(62) Division of application No. 11/793,767, filed as application No. PCT/JP2006/300868 on Jan. 20, 2006, now abandoned.

(30) Foreign Application Priority Data

Jan. 21, 2005 (JP) .................................. 2005-013629

(51) Int. Cl.
G06F 15/16 (2006.01)
G06F 7/00 (2006.01)
G06F 17/00 (2006.01)

(52) U.S. Cl. ........................................ 709/217; 707/640
(58) Field of Classification Search .................. 709/217; 707/640
See application file for complete search history.

(56) References Cited

U.S. PATENT DOCUMENTS

| 5,559,991 A | 9/1996 | Kanfi |
| 6,374,266 B1 | 4/2002 | Shnelvar |
| 6,512,926 B1 | 1/2003 | Henry-Labordere |
| 6,757,698 B2 | 6/2004 | McBride et al. |
| 7,055,008 B2 * | 5/2006 | Niles et al. ..................... 711/162 |
| 7,092,977 B2 * | 8/2006 | Leung et al. .......................... 1/1 |
| 7,194,491 B2 * | 3/2007 | Inagaki ......................... 711/162 |
| 7,406,488 B2 * | 7/2008 | Stager et al. .......................... 1/1 |

(Continued)

FOREIGN PATENT DOCUMENTS

AU  46850/97  6/1998

(Continued)

OTHER PUBLICATIONS

International Search Report issued May 2, 2006 in International (PCT) Application No. PCT/JP2006/300868.

(Continued)

*Primary Examiner* — George C Neurauter
(74) *Attorney, Agent, or Firm* — Wenderoth, Lind & Ponack, L.L.P.

(57) ABSTRACT

In order to allow a user to backup data, a backup system is used to transfer data from an information terminal to a backup device via a relay device. The information terminal includes a storing unit storing the data to be backed up, and includes a communication unit transmitting the data to the relay device and transferring condition information indicating a condition to be satisfied by the relay device. Further, the relay device includes (i) a storing unit storing information relating to transfer destination devices, (ii) a receiving unit receiving the data and the transfer condition information, and (iii) a transfer control unit selecting a transfer destination device that satisfies the condition indicated by the transfer condition information, and controlling transfer of the received data in accordance with the selection. The backup device includes a receiving unit receiving the data transferred by the relay device, and a storing unit storing the received data.

13 Claims, 17 Drawing Sheets

600

| | | |
|---|---|---|
| 61 | TRANSFER DEADLINE | 2005.1.1 |
| 62 | DATA KEEPING DEADLINE | 2005.3.1 |
| 63 | DELETION DEADLINE | NOT DESIGNATED |
| 64 | ADDRESS NOTIFICATION NECESSITY | NECESSARY |
| 65 | HOP NUMBER | 3 |
| 66 | RELIABILITY THRESHOLD VALUE | 80 |
| 67 | BLACKLIST | Musashi005, ·· |

U.S. PATENT DOCUMENTS

| | | |
|---|---|---|
| 2002/0136380 A1 | 9/2002 | Aoyama |
| 2003/0134625 A1 | 7/2003 | Choi |
| 2005/0262168 A1* | 11/2005 | Helliker et al. ............... 707/204 |
| 2007/0099610 A1* | 5/2007 | Kim et al. ................... 455/432.2 |
| 2007/0214231 A1* | 9/2007 | Skinner et al. ................ 709/216 |
| 2008/0086609 A1* | 4/2008 | Lesser et al. .................. 711/162 |

FOREIGN PATENT DOCUMENTS

| | | |
|---|---|---|
| JP | 10-173789 | 6/1998 |
| JP | 11-168526 | 6/1999 |
| JP | 2000-78070 | 3/2000 |
| JP | 2001-16632 | 1/2001 |
| JP | 2002-33798 | 1/2002 |
| JP | 2003-223348 | 8/2003 |
| JP | 2003-347988 | 12/2003 |
| WO | 2007/038595 | 4/2007 |

OTHER PUBLICATIONS

Howe, Denis, "timeout," Free On-line Dictionary of Computing, foldoc.org, 1995, 1 page.

Fielding, R., et al., "Request for Comments (RFC) 2616: Hypertext Transfer Protocol—HTTP/1.1," Jun. 1999, 114 pp.

* cited by examiner

FIG. 6

| | | |
|---|---|---|
| 61 | TRANSFER DEADLINE | 2005.1.1 |
| 62 | DATA KEEPING DEADLINE | 2005.3.1 |
| 63 | DELETION DEADLINE | NOT DESIGNATED |
| 64 | ADDRESS NOTIFICATION NECESSITY | NECESSARY |
| 65 | HOP NUMBER | 3 |
| 66 | RELIABILITY THRESHOLD VALUE | 80 |
| 67 | BLACKLIST | Musashi005,·· |

FIG. 7

| TRANSFER DESTINATION DEVICE NAME | TRANSFER DESTINATION DEVICE ADDRESS | RELIABILITY LEVEL |
|---|---|---|
| jiro002 | 111.222.333.444 | 100 |
| shiro004 | 555.666.777.888 | 80 |
| ichiro001 | 987.654.321.098 | 40 |

FIG. 13

|     |                                  | 1300                              |
|-----|----------------------------------|-----------------------------------|
| 131 | BACKUP SOURCE IDENTIFYING INFORMATION | Hanako001, 123.456.789.001     |
| 132 | KEEPING DEVICE IDENTIFYING INFORMATION | Musashi005, 456.789.012.345 |
| 133 | BACKUP DATA ID                   | Photo1.jpg<br>Photo2.jpg          |
| 134 | BACKUP DATA AMOUNT               | 5MB                               |
| 135 | KEEPING PERIOD                   | 2004.11.1~2005.3.1 (4month)       |
| 136 | SIGNATURE                        | xxxx                              |

TRANSMISSION CONDITION

| | | |
|---|---|---|
| 161a | DATA AMOUNT | 5MB |
| 162a | RECORDING METHOD | DOUBLE RECORDING |
| 163a | KEEPING DEADLINE | 2005. 3. 1 (4month) |

1600b

RECEPTION CONDITION

| | | |
|---|---|---|
| 161b | DATA AMOUNT | 20MB |
| 162b | RECORDING METHOD | SINGLE RECORDING |
| 163b | KEEPING DEADLINE | 2005. 1. 1 (2month) |

RELAY DEVICE

This application is a Divisional of U.S. application Ser. No. 11/793,767, filed Jun. 22, 2007 now abandoned, which is a national stage application of International Application No. PCT/JP2006/300868, filed Jan. 20, 2006.

BACKGROUND OF THE INVENTION

1. Field of Invention

The present invention relates to backup of data stored in mobile communication devices, such as mobile phones.

2. Description of the Related Art

In recent years, mobile communication devices such as mobile phones have been improved in their processing capacity and communication capacity. As a result of such improvements, mobile communication devices are now capable of performing a various types of processing and used for various purposes. For example, camera-equipped mobile phones can be used for taking pictures of friends of users and landscapes while traveling, and saving the pictures such that the users can view the pictures anytime. With camera-equipped mobile phones, it is also possible to exchange data of saved still images and moving pictures among the users, using a communications technology, such as infrared communication. The data saved by the users themselves often reflects the users' personal connections, users' preference, and so on. Therefore, such data is valuable especially for the users concerned with the data.

However, as usually carried about by the users, mobile communication devices are vulnerable to unforeseen circumstances, such as loss due to users' carelessness. If a user loses a mobile communication device, this also means that the user loses the valuable data.

To prevent data from being lost in unforeseen circumstances, techniques for backing up data that is stored in a mobile communication device are widely used.

For example, Patent Documents 1 and 2 listed below disclose a technique for transferring data stored in a mobile phone to a server setup in home or the like, when charging the mobile phone.

Also, Patent Document 3 discloses a technique for performing transmission and reception of data between a mobile phone and a backup center via telephone lines, in order to back up text-based data such as address data whose data size is smaller than still image data and moving picture data.

Patent Document 1: Japanese Laid-open patent Application Publication No. 2003-347988;

Patent Document 2: Japanese Laid-open patent Application Publication No. 2002-33798; and Patent Document 3: Japanese Laid-open patent Application Publication No. 2000-78070.

BRIEF SUMMARY OF THE INVENTION

However, the technique disclosed by Patent Documents 1 and 2 cannot start the data backup immediately if the user cannot charge the mobile communication device immediately, because the backup is triggered by the charging. Especially while the user is on a trip, the risk of the data loss increases as the period for which the user cannot charge the mobile communication device increases.

Regarding the technique disclosed by Patent Document 3, the backup can be completed without any serious problem if the data to be backed up is comparatively small. However, if the only communications means available for the backup is telephone lines and accordingly it is difficult to transfer comparatively large data such as still images and moving pictures in a short period, unignorable problems might occur. For example, since it takes a long time to transfer data via telephone lines, an error might occur halfway through the backup due to weak signal strength. Moreover, if the telephone line is of a pay-as-you-go type, the cost can be very high. Therefore, in view of practical use, it is difficult to execute the backup.

Alternatively, it is possible to use network connection services, such as a public wireless LAN network, to backup data. Such services realize comparatively high-speed transfer of data to backup devices.

However, in the network, the pathway to be used for transferring data is usually determined by a router or the like. Therefore, it is difficult for the users to predict which pathway is to be used in transfer of the data.

This means that it is difficult for the users to predict to whom the data will be exposed. Therefore, the users feel insecure about transmitting data including personal information via a network. Especially, regarding mobile communication devices demanded to be smaller, it is sometimes difficult to take measures to protect the data by encryption or the like, because of functional constraint of the mobile communication devices. In such a case, the users feel very insecure.

The object of the present invention is to provide a backup system and a backup method that allow a user to easily back up data without anxiety even if a mobile communication device such as a mobile phone cannot directly communicate with a backup device or a transmission speed of a communication line, between the communication device, and the backup device is not high enough to transmit large data.

To solve the above-described problems, the present invention provides a backup system that transfers data transmitted by an information terminal device to a backup device via at least one relay device that relays the data, the information terminal device comprising: a storing unit operable to store the data to be backed up; and a communication unit operable to transmit, to the relay device, the data and transfer condition information that indicates a condition to be satisfied by the relay device and relates to protection of the data. The relay device comprises: a device information storing unit operable to store device information relating to transfer destination devices; a receiving unit operable to receive the data and the transfer condition information; and a transfer control unit operable to select, from the transfer destination devices, a transfer destination device that satisfies the condition indicated by the received transfer condition information, and to control transfer of the received data in accordance with the selection. Further, the backup device comprises: a backup data receiving unit operable to receive the data transferred by the relay device; and a backup data storing unit operable to store the received data.

The present invention also provides a relay device that relays data transmitted by an information terminal device to a backup device, comprising: a device information storing unit that stores device information relating to devices as candidates for a transfer destination of the data; a receiving unit operable to receive the data and transfer condition information that indicates a condition to be satisfied by the relay device and relates to protection of the data; and a transfer control unit operable to select, from the candidates, a device that satisfies the condition indicated by the received transfer condition information, and to control transfer of the received data in accordance with the selection.

The present invention also provides an information terminal device that transmits data to a backup device via at least one relay device that relays the data, the information terminal device comprising: a storing unit operable to store the data to be backed up; and a communication unit operable to transmit, to the relay device, the data and transfer condition information that indicates a condition to be satisfied by the relay device and relates to protection of the data.

With the stated structure, even if the information terminal device cannot directly communicate with the backup device, the user of the information terminal device can back up the data by transmitting the data and the transfer condition information to the relay device. Therefore, the user does not lose the data even if it becomes impossible to use the information terminal device due to lost of the information terminal device, for example.

Also, the relay device with the stated structure can receive the transfer condition information with the transfer data, select another relay device as a transfer destination device based on the transfer condition information, and transmit the transfer data to the transfer destination device. Therefore, it is possible to perform the transfer with protecting the transfer data. In other words, the user can transfer the data via a transfer pathway limited by the user to protect the data.

Accordingly, the user can reduce the risk of an invasion of privacy, and backup the data without anxiety.

Here, the condition indicated by the transfer condition information may be that a device is not in a blacklist showing devices not permitted to be the transfer destination, and the transfer control unit may select, from the candidates, a device that is not in the blacklist.

With the stated structure, the user can prevent the data to be backed up from being relayed by an undesired relay device.

The device information may include a reliability level for each of the candidates, the transfer condition information may indicate a threshold value of the reliability level to be satisfied by the transfer destination, and the transfer control unit may select, from the candidates, a device that satisfies the threshold value.

By performing the backup via the relay device having the stated structure, it is possible to limit the transfer pathway using only the reliability threshold value, instead of determining, for each transfer destination device, whether to permit the device to transfer the data. Therefore, this realizes the protection of the transfer data easily. Also, the user can flexibly set the level of the limitation of the transfer pathway depending on the data content by changing the threshold value depending on the data content.

For example, when transmitting data desired to be kept in strict confidence, such as private picture data, it is possible to strictly limit the pathway such that the data is relayed by only a highly reliable device. On the other hand, when transmitting data that cannot be a disadvantage for the user even if it is exposed to the public, such as landscape picture data, it is possible to permit a relay device with low reliability to perform the transfer.

The transfer control unit may further include a conversion processing subunit operable to perform predetermined conversion processing on the data, and may transfer the data after performing the predetermined conversion processing on the data.

With the stated structure, it is possible to perform the transfer of the data with strict protection.

The transfer control unit may control the transfer such that the data converted by the conversion processing subunit is transferred to a device not satisfying the condition indicated by the transfer condition information.

With the stated structure, the predetermined conversion processing is performed only in the case where the data is transmitted to the device not satisfying the condition indicated by the transfer condition information. Accordingly, while protecting the data, it is possible to effectively process the data in accordance with the reliability level of the transfer destination device.

The predetermined conversion processing performed by the conversion processing subunit may be insertion of an identifier of the relay device, as a digital watermark, into the data.

With the stated structure, even if the data is used by an unauthorized user, it is possible to track the unauthorized user, using the watermark. As a result, it becomes easy to manage such an unauthorized use of the data.

Meanwhile, if the transfer data is kept by the relay device for a long time, there is a risk of leakage of the data due to problems with the relay device. Also, if the user cannot know when the backup will be completed, the user feels insecure because he cannot confirm that the backup is surely executed. Therefore, the time when the backup will be completed is of high interest to the user.

For this reason, the receiving unit may further receive at least one of a transfer deadline, a data keep deadline and a deletion deadline. If the receiving unit receives the transfer deadline, the relay device may control the transfer, using the transfer control unit, such that the data is received by the backup device before the transfer deadline, if the receiving unit receives the data keeping deadline, the relay device may keep the data until the keeping deadline, and if the receiving unit receives the deletion deadline, the transfer control unit may delete the data at the deletion deadline.

With the stated structure, in view of protection of the data, it is possible to reduce the risk of the relay device keeping the data for a long time. Also, the user can know when the backup will be completed at the latest. Therefore, the user can perform the backup without anxiety.

The relay device may further comprise: an exchange information transmitting unit operable to create and transmit exchange information indicating that the data received by the receiving unit is kept in the relay device; and a transfer request receiving unit operable to receive, from another device that has received the exchange information, a request for transfer of the data corresponding to the exchange information, wherein if the transfer request receiving unit receives the transfer request, the transfer control unit may control the transfer such that the data relating to the transfer request is transmitted to said another device. Moreover, a backup device that receives data transmitted from an information terminal device via the above-described relay device may comprise: an exchange information transmitting unit operable to receive the exchange information from another device; a transfer request transmitting unit operable to transmit a request for transferring the data to the relay device that keeps the data; a backup data receiving unit operable to receive the data relating to the request; and a backup data storing unit operable to store the received data.

Since the relay device having the stated structure controls transfer of the data on reception of a transfer request from another device such as the backup device that has received the identifier information, the device that has received the identifier information can inquire of the relay device as to the data to be backed up.

Meanwhile, according to the method for the back up described above, the data stored in the information terminal device is backed up by the aid of the relay device. In this method, the relay device keeps the data transmitted by the information terminal device, and performs processing for the relay operation, which means that the resource of the relay device is consumed for the backup. In other words the processing capacity of the relay device is used for the backup of the data of the information terminal device in a one-sided manner.

For this reason, before transmitting the data, the communication unit may transmit first transmission/reception condition information to a relay device, and receives second transmission/reception condition information from the relay device, and the information terminal device may further comprise a judging unit operable to judge whether the first transmission/reception condition information and the second transmission/reception condition information are substantially the same, and if the judging unit judges affirmatively, the communication unit may transmit the data to the relay device.

With the stated structure, the information terminal device exchanges the transmission/reception condition information with the relay device, and judges whether to transfer the data based on pieces of the transmission/reception condition information received by the information terminal device and the relay device respectively. Therefore, it is possible to control the backup by mutual consent between the information terminal device and the relay device.

The first transmission/reception condition information may be associated with transmission data that the information terminal device transmits, the second transmission/reception condition information may be associated with reception data that the information terminal device receives from the relay device, if the judging unit judges affirmatively, the communication unit may transmit the transmission data to the relay device and receives the reception data from the relay device, and the storing unit may store the received reception data.

The information terminal device with the stated structure stores, when transmitting the transfer data to be backed up, the data transmitted from the relay device. Therefore, it is possible to perform the backup in a fair manner, without one-sidedly using the processing capacity and the resource of one of information terminal device and the relay device.

Each of the first transmission/reception condition information and the second transmission/reception condition information may include at least one of a size of the data, a keeping deadline until which the relay device or the information terminal device keeps the data, a recording method for recording the data in a recording medium and an incentive for keeping the data.

With the stated structure it is possible to judge whether to transfer the data based on the combination of the plurality of conditions. Therefore, it is possible to set the permissible range to detail.

The incentive may include at least one of value information having a cash value, relay device control information indicating a right to have the relay device perform predetermined processing, and viewing right information indicating a right to view a predetermined content.

With the stated structure, it is possible to obtain the predetermined right not only by performing the mutual backup but also by keeping the backup data transmitted from another device as party. Therefore, it is possible to encourage the user of a device to keep data transmitted from another device.

The storing unit may further store relay device information relating to relay devices as candidates for a transfer destination of the data, and the communication unit may select, from the candidates, a device that satisfies the condition indicated by the condition information, and transmit the data and the transfer condition information in accordance with the selection.

With the stated structure, it is possible to control the transfer of the data in accordance with whether it is possible to protect the data. Therefore, the user of the information terminal device can perform the backup without anxiety.

The present invention may be an integrated circuit used for an information terminal device that transmits data to a backup device via at least one relay device that relays the data, the integrated circuit comprising: a storing unit operable to store the data to be backed up; and a communication unit operable to transmit the data and transfer condition information that indicates a condition to be satisfied by the relay device and relates to protection of the data.

The present invention may also be a computer program for instructing an information terminal device that stores data to be backed up to transmit the data to a backup device via at least one relay device that relays the data, the computer program comprising the step of transmitting the data and transfer condition information that indicates a condition to be satisfied by the relay device and relates to protection of the data.

The present invention may also be a backup method for transferring data transmitted by an information terminal device to a backup device via at least one relay device that relays the data, the backup method comprising: the steps performed by the information terminal device of storing the data to be backed up, and transmitting, to the relay device, the data and transfer condition information that indicates a condition to be satisfied by the relay device and relates to protection of the data; the steps performed by the relay device of storing device information relating to devices as candidates for a transfer destination of the data, receiving the data and transfer the condition information, and selecting, from the candidates, a device that satisfies the condition indicated by the received transfer condition information, and controlling the transfer of the received data in accordance with the selection; and the steps performed by the backup device of receiving the data transferred by the relay device; and storing the received data.

The present invention may also be a backup method for backing up data with use of a first information terminal device and a second information terminal device, the backup method comprising: a storing step of storing the data to be backed up; and a communication step of transmitting the data and transfer condition information that indicates a condition to be satisfied by the relay device and relates to protection of the data, wherein when performed by the first information terminal device, the communication step further transmits first transmission/reception condition information to the second information terminal device and receives second transmission/reception condition information from the second information terminal device, before transmitting first data to the second information terminal device, and when performed by the second information terminal device, the communication step further transmits the second transmission/reception condition information to the first information terminal device and receives the first transmission/reception condition information from the first information terminal device, before transmitting the second data to the first information terminal device, wherein the backup method further comprises a judging step of judging whether the first transmission/reception condition information and the second transmission/reception condition information are substantially the same, wherein when performed by the first information terminal device, the communication step further transmits the first data to the second information terminal device if the judging step judges affirmatively, and when performed by the second information terminal device, the communication step further transmits the second data to the first information terminal device.

BRIEF DESCRIPTION OF THE DRAWINGS

FIG. 6 is a table 600 showing transfer condition information;

FIG. 7 is a table 700 showing reliability threshold values;

FIG. 13 shows exchange information 1300;

FIG. 16 shows tables showing transmission/reception condition information; and

DETAILED DESCRIPTION OF THE INVENTION

First Embodiment

The following describes the first embodiment of a backup system according to the present invention.

<Overview>

In the backup system according to the present invention, an information terminal device transmits data stored therein and is to be backed up to a backup device via relay devices that relays the data. In the first embodiment, it is assumed that the information terminal device is a mobile phone. To back up the data stored in the mobile phone in the backup device owned by the user of the mobile phone, another backup device owned by a user of another mobile phone relays the data. Note that the data to be backed up is, for example, still images and moving pictures acquired by the mobile phone using a camera function thereof. The following describes the backup system in detail.

Figure 1:
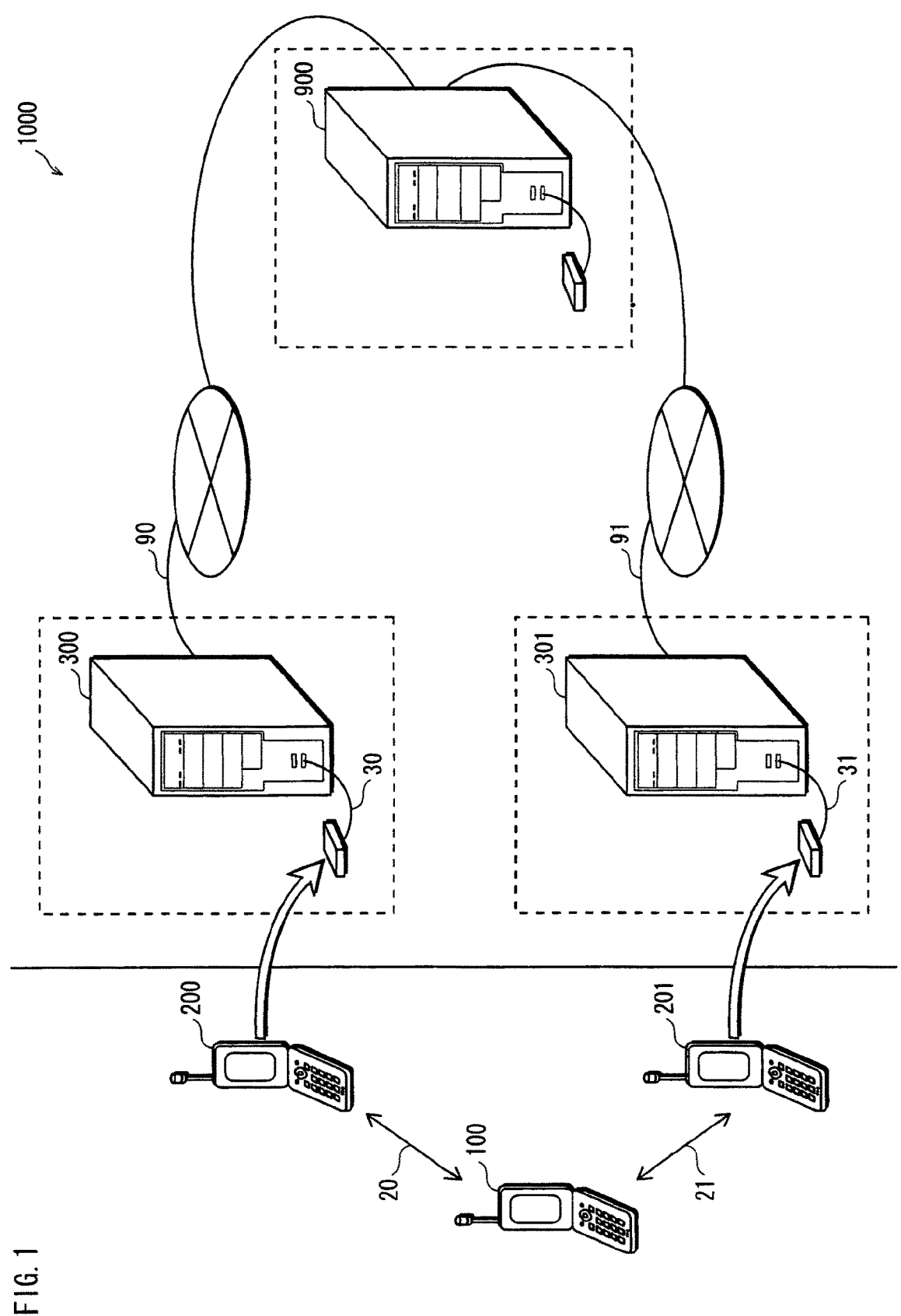
FIG. 1 shows an overall structure of a backup system 1000 according to the first embodiment of the present invention.

FIG. 1 shows an overall structure of the backup system 1000 according to the first embodiment of the present invention.

As FIG. 1 shows, the backup system 1000 includes a mobile phone 100 as an information terminal device that transmits data to be backed up to a backup device, a mobile phone 200 as a relay device that relays the transmitted data, a backup server 300, a mobile phone 201, a backup server 301, and a backup server 900 as the backup device that backs up the data of the mobile phone 100.

The mobile phone 100 and the mobile phone 200 are connected with each other via a communication path 20. In the same manner, the mobile phone 200 and the backup server 300 are connected with each other via a communication path 30, and the backup server 300 and the backup server 900 are connected with each other via a communication path 90. Also, the mobile phone 100 and the mobile phone 201 are connected with each other via a communication path 21, the mobile phone 201 and the backup server 301 are connected with each other via a communication path 31, and the backup server 301 and the backup server 900 are connected with each other via a communication path 91.

The following is a situation assumed in the first embodiment where the backup is performed. First of all, it is assumed that a user 1 as the user of the mobile phone 100 connects, usually when he gets home, the mobile phone 100 with the backup server 900 set up in his home to perform backup. The backup method used here is such as those disclosed in Patent Documents 1 and 2, i.e. transmitting backup data to the backup server 900 when the mobile phone is connected with a battery charger. Note that it is also assumed that the backup server 900 is connected with an external network.

Here, if the user 1 is on a long-term trip with a user 2, and cannot use a high-speed network such as a broadband communication network to have the mobile phone 100 connect with the backup server 900 set up in his home, it is difficult to make a backup using the backup server 900. In such a case, the user 1 transfers the data to be backed up to the mobile phone 200 owned by the user 2 accompanying the user 1, via the communication path 20.

The communication path 20 is, for example, a broadband ad-hoc short-range wireless network such as Bluetooth, a USB (Universal Serial Bus) connection and a wireless LAN (Local Area Network), or a UWB (Ultra Wide Band), a PAN (Personal Area Network), a wired connection, or a hand-to-hand transfer of an external medium such as a recording medium.

In this way, by transferring backup data to the mobile phone 200, the user 1 can protect the backup data against loss even in the case where the user 1 cannot make backup using the backup server 900 and loses the mobile phone 100.

If receiving the backup data of the mobile phone 100 by the mobile phone 200, the user 2 connects the mobile phone 200 with the backup server 300 owned by the user 2 when he gets home, to transmit the backup data received from the mobile phone 100 together with the backup data of the mobile phone 200 itself to the backup server 300 via the communication path 30. The backup server 300 is connected with a network. The backup server 300 transmits the backup data of the mobile phone 100 to the backup server 900, which is connected to the network as well, via the communication path 90. The communication path 90 is, for example, a broadband communication network using fiber optics, and it is assumed that the communication path 90 can transfer data at a comparatively high speed. The broadband communication network is a communications channel having a broad bandwidth. In recent years, carriers such as ISPs (Internet Services Providers) have been offering flat-rate pricing for internet access services. Therefore, the cost of the data transmission via the communication path 90 is not a great burden for the user 2.

The backup server 900 receives and records the backup data of the mobile phone 100, which has been transmitted from the backup server 300 via the communication path 90.

As described above, the user 1 can make a backup using the relay devices that relays the data via the communication path 20, the communication path 30 and the communication path 90.

<Structure>

Next, the functional structure of each of the information terminal device, the relay devices and the backup device included in the backup system 1000 is explained. As described above, it is assumed that the information terminal is the mobile phone 100. Also, it is assumed that the relay devices are the mobile phone 200, the backup server 300 and so on, and the backup device is the backup server 900.

<Information Terminal Device>

Figure 2:
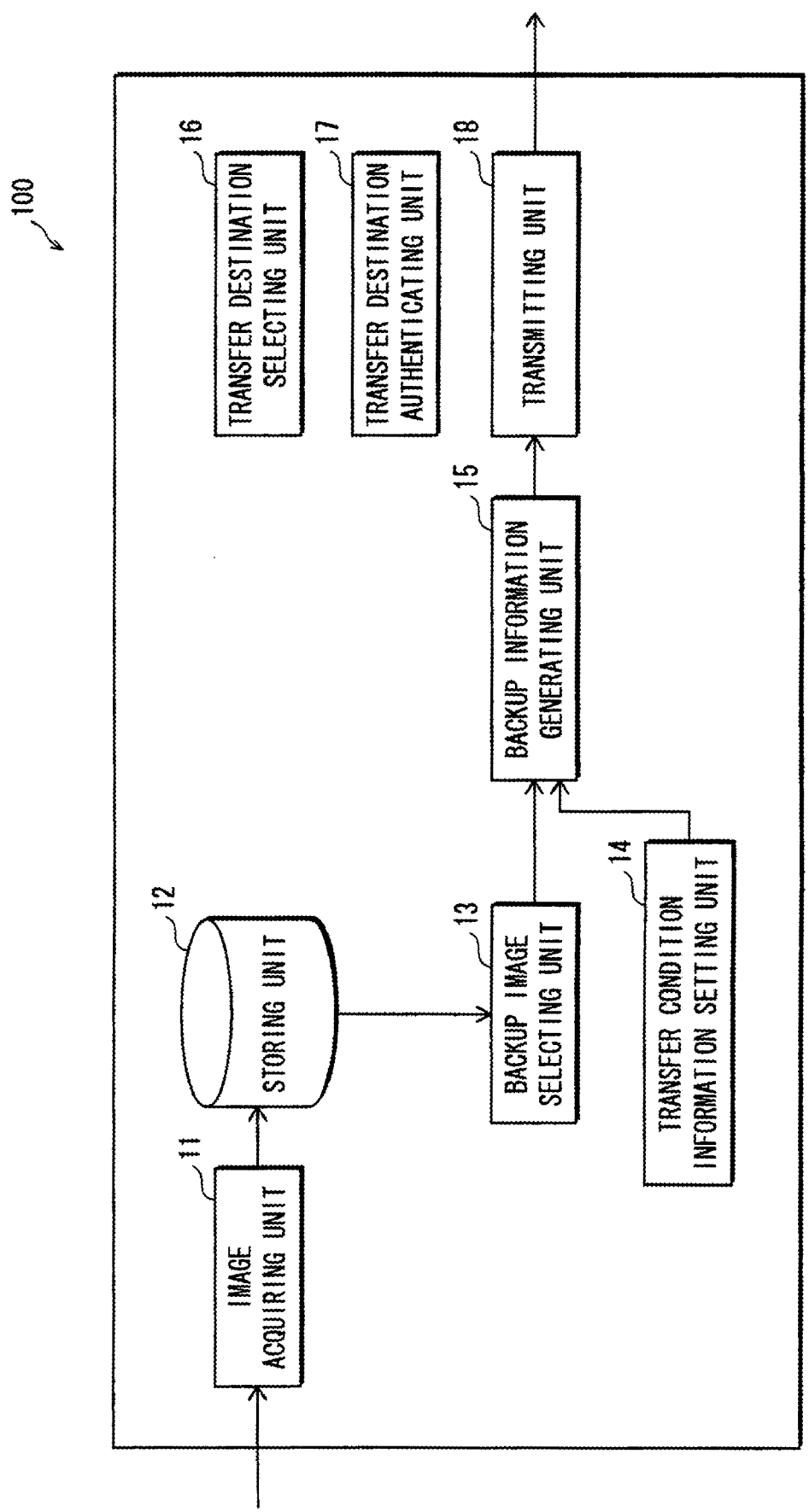
FIG. 2 is a functional block diagram of a mobile phone 100.

FIG. 2 is a functional block diagram of the mobile phone 100.

As FIG. 2 shows, the mobile phone 100 as an information terminal device includes an image acquiring unit 11, a storing unit 12, a backup image selecting unit 13, a transfer condition information setting unit 14, a backup information generating unit 15, a transfer destination selecting unit 16, a transfer destination authenticating unit 17, and a transmitting unit 18. Each of the components above is structured from, for example, a control circuit including a CPU (Central Processing Unit), a ROM (Read Only Memory), a RAM (Random Access Memory) and so on, and a transmission/reception circuit for transmitting and receiving data. The backup is performed by the components in accordance with a computer program. The following describes the function of each component.

The image acquiring unit 11 is a camera module or the like that realizes the camera function of the mobile phone 100, and acquires data such as still images and moving pictures.

The storing unit 12 stores the data acquired by the image acquiring unit 11 using a storage medium such as a memory and a HDD (Hard Disk Drive).

The backup image selecting unit 13 selects, from pieces of the data stored in the storing unit 12, a piece of data to be transferred by the relay devices and backed up.

The transfer condition information setting unit 14 sets up transfer condition information, which is explained in a later section.

The backup information generating unit 15 adds the transfer condition information and so on to transfer data, that is, data selected by the backup image selecting unit 13, to generate data to be transmitted.

The transfer destination selecting unit 16 selects a transfer destination with which the mobile phone 100 can connect and communicate via a communication path.

The transfer destination authenticating unit 17 authenticates a device at a transfer destination to which the data is transferred. The transmitting unit 18 transmits the data to the device at the transfer destination.

<Relay Device>

Next, the functional structure of the relay device is explained.

Figure 3:
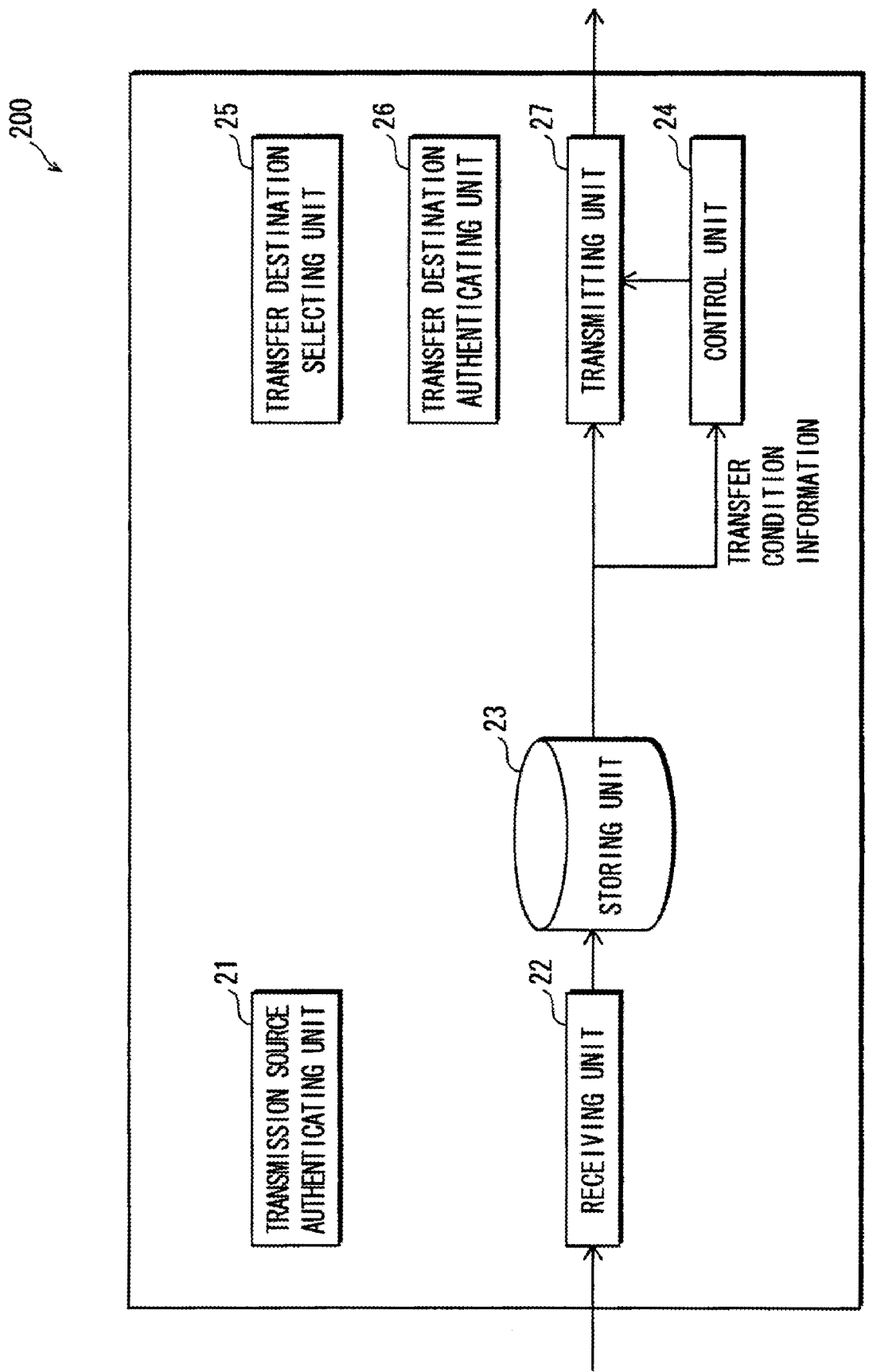
FIG. 3 is a functional block diagram of a mobile phone 200.

FIG. 3 is a functional block diagram of the mobile phone 200.

As FIG. 3 shows, the mobile phone 200 includes a transmission source authenticating unit 21, a receiving unit 22, a storing unit 23, a control unit 24, a transfer destination selecting unit 25, a transfer destination authenticating unit 26, and a transmitting unit 27. Each of the components above is structured from, for example, a control circuit including a CPU (Central Processing Unit), a ROM (Read Only Memory), a RAM (Random Access Memory) and so on, and a transmission/reception circuit for transmitting and receiving data. The transfer of data to another device via the relay device is performed by the components in accordance with a computer program. The following describes the function of each component.

The transmission source authenticating unit 21 authenticates a device at a transmission source of data at the other end, at reception of the data.

The receiving unit 22 receives data via a communication path.

The storing unit 23 stores received data in a memory, HDD, or the like.

The control unit 24 controls transmission of data to a transfer destination device.

The transfer destination selecting unit 25 selects a transfer destination with which the mobile phone 200 can directly connect and communicate via a communication path.

The transfer destination authenticating unit 26 authenticates a device at a transfer destination to which data is transferred. Note that any method may be used for the authentication between devices. In this embodiment, a well-known method such as challenge-response authentication is used. This is same as to the other devices.

The transmitting unit 27 transmits data to a device at a transfer destination.

Figure 4:
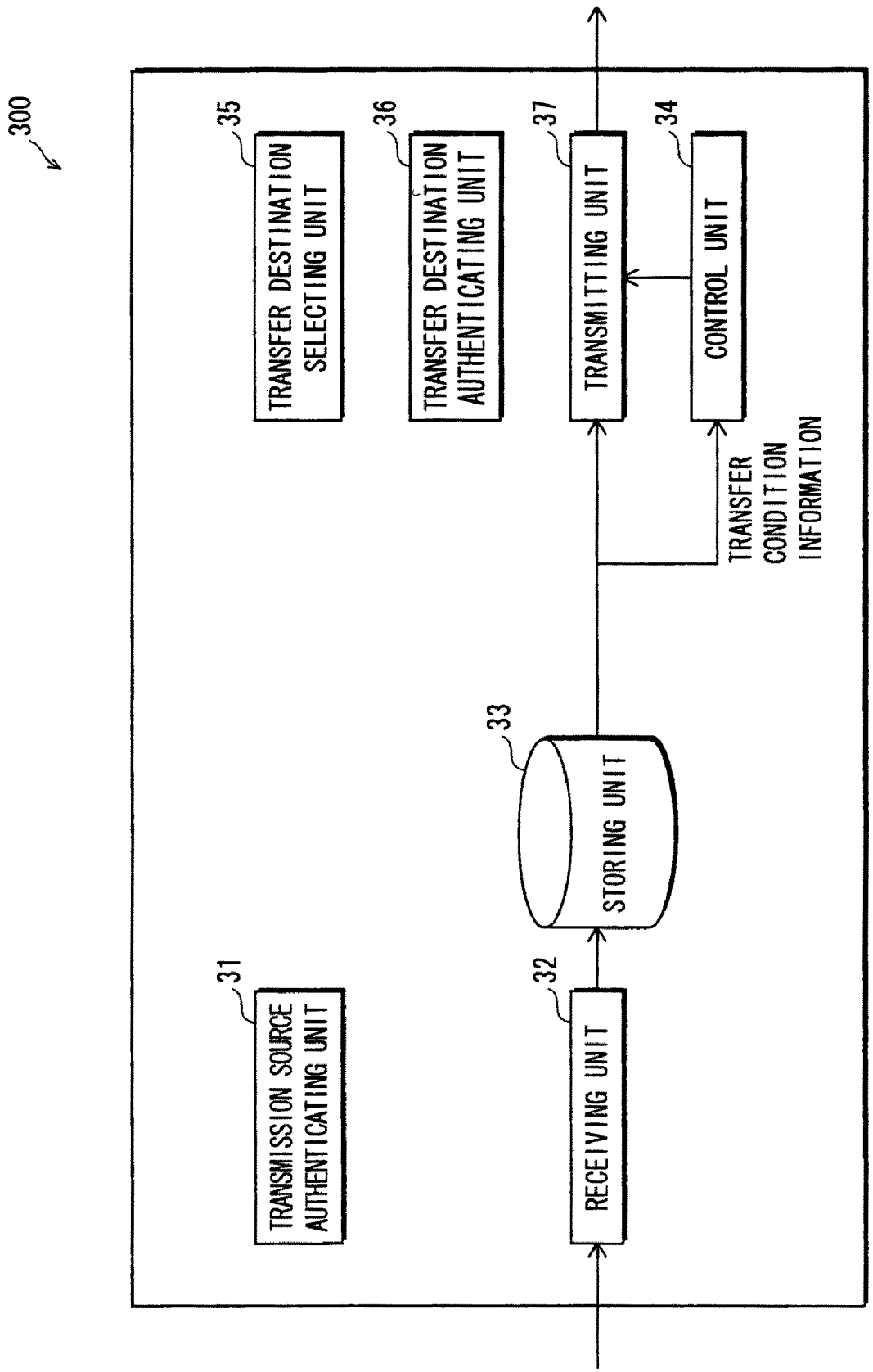
FIG. 4 is a functional block diagram of a backup server 300.

FIG. 4 is a functional block diagram of the backup server 300. The backup server 300 has almost the same structure as the mobile phone 200.

As FIG. 4 shows, the backup server 300 includes a transmission source authenticating unit 31, a receiving unit 32, a storing unit 33, a control unit 34, a transfer destination selecting unit 35, a transfer destination authenticating unit 36, and a transmitting unit 37.

Each of the components above achieves the function of the corresponding component of the mobile phone 200. That is to say, the transmission source authenticating unit 31 authenticates, in the same manner as the transmission source authenticating unit 21, a device at a transmission source of data at the other end, at reception of the data. The transmission source authenticating unit 31, the receiving unit 32, the storing unit 33, the control unit 34, the transfer destination selecting unit 35, the transfer destination authenticating unit 36, and the transmitting unit 37 have the same function as the transmission source authenticating unit 21, the receiving unit 22, the storing unit 23, the control unit 24, the transfer destination selecting unit 25, the transfer destination authenticating unit 26, and the transmitting unit 27 respectively. Therefore, the explanations thereof are omitted here.

<Backup Device>

Next, the functional structure of the backup device is explained.

Figure 5:
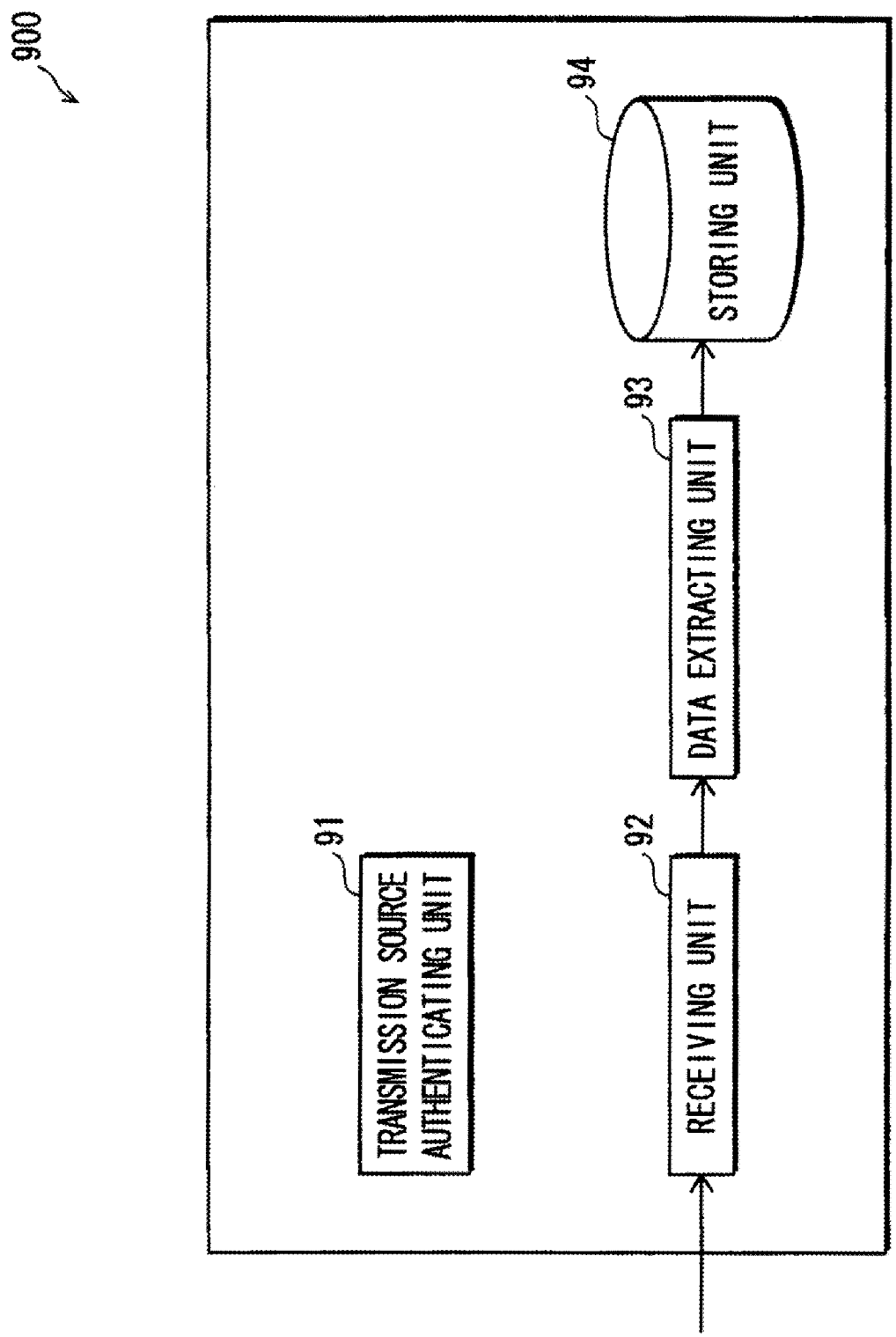
FIG. 5 is a functional block diagram of a backup server 900.

FIG. 5 is a functional block diagram of the backup server 900.

As FIG. 5 shows, the backup server 900 includes a transmission source authenticating unit 91, a receiving unit 92, a data extracting unit 93 and a storing unit 94. Each of the components above is structured from, for example, a control circuit including a CPU, a ROM, a RAM and so on, a reception circuit for receiving data, and a large-capacity recording medium for storing and accumulating data.

The reception of data, extraction of transfer data, and storage of the data is performed by the components in accordance with a computer program.

The transmission source authenticating unit 91 authenticates, upon reception of data, a transmission source device as the party of the communication.

The receiving unit 92 receives data via a communication path.

The data extracting unit 93 extracts transfer data included in data received by the receiving unit 92.

The storing unit 94 stores transfer data extracted by the data extracting unit 93.

<Data>

Next, the above-described transfer condition information is explained.

The transfer condition information is information indicating conditions that should be satisfied by the relay devices when relaying and transferring data. The transfer condition information includes pieces of information used for protection of the transfer data to be backed up. In this embodiment, the protection of the transfer data means protection of privacy relating to the transfer data.

The transfer condition information is transmitted with the transfer data when the information terminal device transmits the transfer data. The information terminal device can limit the pathway to be used for the relay by performing the transfer in accordance with the transfer condition information. Note that the information terminal device also transmits predetermined information required for executing the backup via the communication paths in addition to the transfer condition information. The predetermined information includes, specifically, transfer data identifying information that identifies the transfer data, user identifying information that identifies an owner of the transfer data, address information indicating an address of the backup device that is a destination of the transfer data, and so on.

The following describes the transfer condition information in detail.

FIG. 6 is a table showing transfer condition information 600.

As FIG. 6 shows, the transfer condition information 600 includes a transfer deadline 61, a data keeping deadline 62, a deletion deadline 63, an address notification necessity 64, a hop number 65, a reliability threshold value 66 and a blacklist 67.

The transfer deadline 61 indicates a deadline for transferring transfer data to the backup device. In FIG. 6, for example, the transfer deadline 61 indicates that the transfer data is to be transferred to the backup device before Jan. 1, 2005.

The data keeping deadline 62 indicates at least until when the relay device that relays the transfer data should keep the transfer data. After the data keeping deadline, the relay device may delete the transfer data. If the deadline is set with use of the data keeping deadline 62, it becomes unnecessary for the relay device to endlessly keep the transfer data which will not be collected. As a result, it becomes possible to effectively use a storage area included in the relay device. In FIG. 6, for example, the data keeping deadline 62 indicates that the transfer data should be kept by the relay device until Mar. 1, 2005.

The deletion deadline 63 indicates a deadline at which transfer data as a relay target should be deleted from each storing unit of the relay device. With use of the deletion deadline 63, it becomes possible to make it mandatory for the relay device to delete transfer data at the dead line indicated by the deletion deadline 63. As a result, if the user of the information terminal device fails to collect the data to be backed up, the risk of a violation of privacy due to the transfer data unnecessarily remained in the relay device is reduced. In FIG. 6, for example, the deletion deadline 63 is "not designated", which means that the relay device is not required to delete transfer data.

The address notification necessity 64 indicates whether it is necessary to notify the information terminal device that has transmitted the transfer data of an address of the relay device that has received the transfer data. If the user of the information terminal device that has transmitted the transfer data is notified of the address by the relay device, the information terminal device can grasp which relay device keeps the transfer data. As a result, even in the case of losing the information terminal device, the user can collect the data to be backed up by inquiring the relay device at the notified address. In FIG. 6, for example, the address notification necessity 64 indicates "necessary". Therefore, upon receiving the transfer data, the relay device notifies the information terminal device of the address of the relay device itself. If the address notification necessity 64 does not indicate "necessary", the relay device is not required to notify the information terminal device of the address.

The hop number 65 indicates the number of relay devices that are permitted to relay the transfer data before the transfer data reaches at the backup device. In other words, the hop number 65 indicates the upper limit of the number of transfers. With use of the hop number 65, it is possible to prevent data transmission using an unnecessarily long relay pathway. This reduces the risk of leakage of transfer data to an extraneous user. In FIG. 6, for example, the hop number 65 indicates "3", which means that the upper limit of the number of transfers is three times.

The reliability threshold value 66 is information indicating the lower limit of a reliability level of a transfer destination device to which transfer of the transfer data is permitted. Here, the reliability level of a transfer destination indicates how reliable the device is. In this embodiment, the reliability level is digitized. For example, the reliability level of a device that is entirely reliable is 100, the reliability level of a device that is not reliable at all is 0, and a reliability level of a device that is not reliable very much is 20. Note, in this embodiment, that the maximum value of the reliability level is 100, and the minimum value of the reliability level is 0. A high reliability level represents high reliability. The relay device stores values of the reliability level respectively in association with transfer destination devices. For example, the relay device stores a reliability threshold value table 700 as shown in FIG. 7.

The reliability threshold value table 700 is described next. The reliability threshold value table 700 includes a transfer destination device name 71, a transfer destination device address 72 and a reliability level 73.

The transfer destination device name 71 indicates the name of the device that is a destination of the transfer.

The transfer destination device address 72 indicates an address of the transfer destination device.

The reliability level 73 indicates a reliability level of the transfer destination device.

The relay device refers to the value indicated by the reliability threshold value 66 included in the transfer condition information 600 shown in FIG. 6, to control the transfer. In the example of FIG. 6, the reliability threshold value 66 indicates a value "80". This means that only devices whose reliability level is not less than 80 are permitted to be a transfer destination.

Note that the value of the reliability level stored in each relay device may be predetermined by the user, or set by the relay device based on a history of communications with the transfer destination device. The history is, specifically, the number of transfers of transfer data to the transfer destination device, a history of data transmission and reception, and so on. Furthermore, the relay device may acquire the value of the reliability level from another device. Also, as to the reliability level of the transfer destination device not stored by the relay device, the relay device may calculate the reliability level based on the reliability level of each device on a pathway of the data to the transfer destination device.

The blacklist 67 is information indicating devices that are not permitted to be the transfer destination. Specifically, the blacklist 67 indicates names and addresses of such devices. With use of the blacklist 67, it becomes possible to avoid that the transfer data is transferred to a device that is not desired, by the information terminal device, to be a transfer destination. In the example shown in FIG. 6, the blacklist 67 indicates that the transfer data is not permitted to be transferred to a device "Musashi005" and so on.

<Operations>

Operations performed by the information terminal device, the relay device and the backup device are described next. As described in the Overview, it is assumed that the information terminal device is the mobile phone 100, the relay devices are the mobile phone 200 and the backup server 300, and the backup device is the backup server 900.

<Operations of Information Terminal Device>

Figure 8:
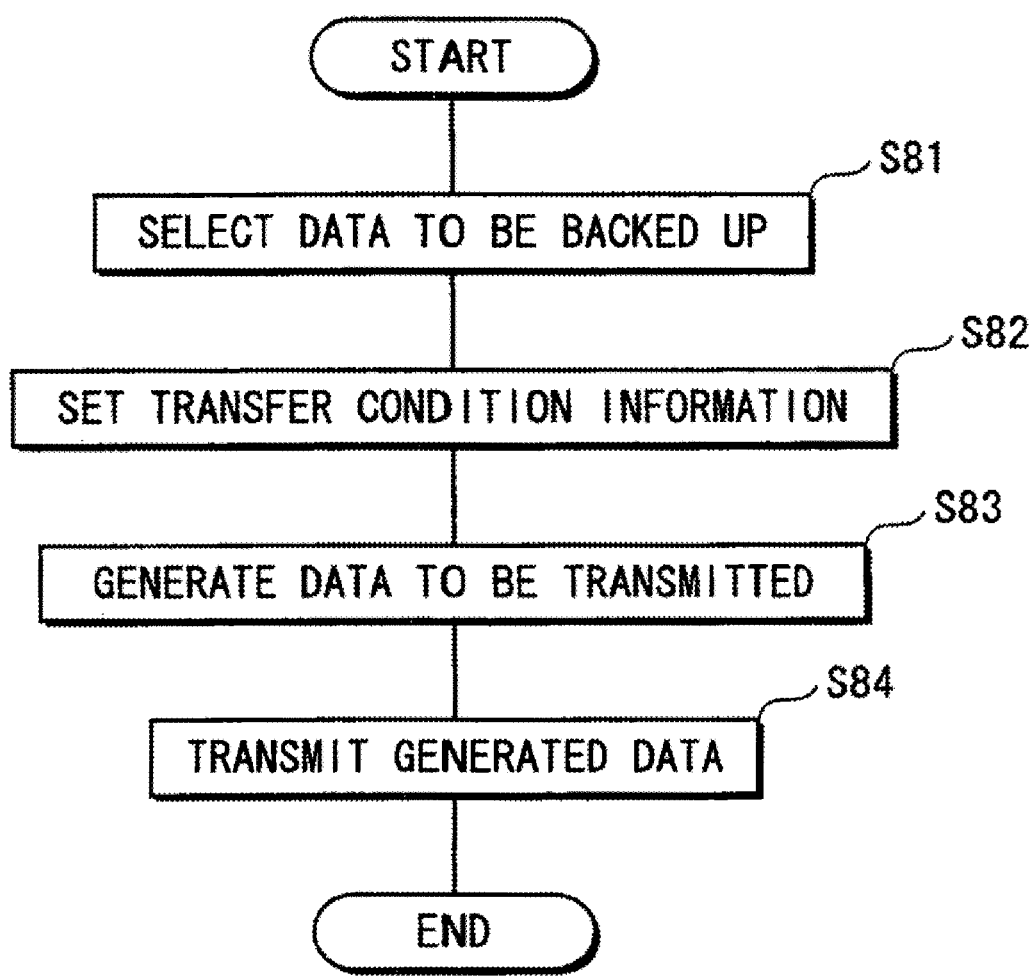
FIG. 8 is a flowchart showing operations performed by an information terminal device.

FIG. 8 is a flowchart showing operations performed by the mobile phone 100 as the information terminal device.

Using the backup image selecting unit 13, the mobile phone 100 selects a piece of data to be backed up from pieces of data that have been acquired by the image acquiring unit 11 and stored in the storing unit 12 (Step S81). Here, the data to be backed up may be designated by the user.

Using the transfer condition setting unit 14, the mobile phone 100 sets the transfer condition information for the selected data to be backed up (Step S82). The transfer condition may be manually set by the user, or automatically set by the mobile phone 100 in accordance with information relating to the data, such as the date when the data is acquired.

Upon the setting of the transfer condition by the transfer condition setting unit 14, the mobile phone 100 generates, using the backup information generating unit 15, data to be transferred to the relay device, based on predetermined information, such as a transmission source address, an address of the backup device that is the final destination and information identifying the data to be backed up, and the transferred data to be backed up, and the transferred condition information (Step S83).

After the generation of the data, the transfer destination selecting unit 16 selects a transfer destination with which the mobile phone 100 can directly connect and communicate via a communication path. In this embodiment, it is assumed that the mobile phone 100 selects the mobile phone 200. Upon selecting the mobile phone 200, the mobile phone 100 authenticates the mobile phone 200, using the transfer destination authenticating unit 17. If the mobile phone 100 succeeds in mutual authentication with the mobile phone 200, the mobile phone 100 transmits the data generated by the backup information generating unit 15 to the mobile phone 200, using the transmitting unit 18, via the communication path 20 (Step S84).

<Operations of Relay Device>

Figure 9:
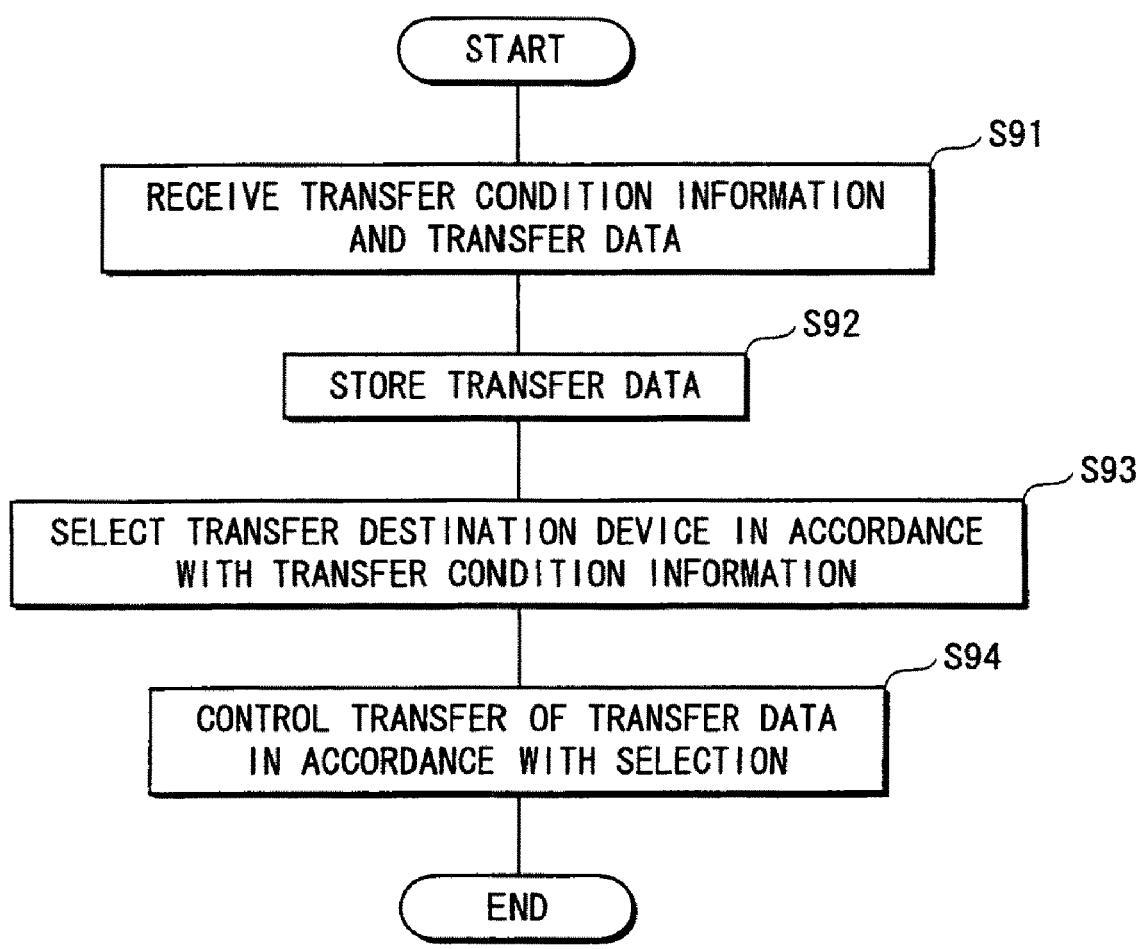
FIG. 9 is a flowchart showing operations performed by a relay device.

FIG. 9 is a flowchart showing operations performed by each relay device, such as the mobile phone 200. The following explains specific operations of mobile phone 200 as well as general operations performed by the relay device.

For receiving data, the relay device authenticates the transmission source device, using the transmission source authenticating unit 21.

If the relay device succeeds in the mutual authentication with the transmission source device, the relay device receives the data transmitted by the transmission source device via the communication path, using the receiving unit 22. The received data includes the transfer condition information and the transfer data (Step S91).

The transfer data included in the data received from the transmission source device is stored in the storing unit 23 (Step S92).

When the transfer data is stored, the control unit 24 controls the transfer of the transfer data in accordance with the transfer condition information. Specifically, if there is any transfer destination device that satisfies the transfer condition information among the devices that the mobile phone 200 can communicate with, the control unit 24 selects a transfer destination device to which the data is transferred, using the transfer destination selecting unit 25 (Step S93). If not, the control unit 24 does not select any transfer destination device. In the case where the mobile phone 200 can directly communicate with the backup device at a relatively high speed, e.g. more than a predetermined transfer rate, the control unit 24 selects the backup device as the transfer destination device.

Using the transfer condition information 600 shown in FIG. 6, the following specifically describes the operations performed by the control unit 24 to control the transfer of the transfer data based on the transfer condition information. Firstly, transfer control using the hop number 65 is described. If the value indicated by the hop number 65 is greater than "1", the control unit 24 selects a transfer destination device, decrements the hop number by one, and performs the transfer. If the hop number 65 is not greater than "1", the control unit 24 does not perform the transfer. In the example shown in FIG. 1, the mobile phone 100 as the information terminal device firstly sets a value "3" to the hop number 65. Then, the mobile phone 200 as the relay device decrements the hop number 65 by one so as to be "2", and performs the transfer. Further, the backup server 300 that has received the transfer data whose hop number is "2" confirms that the hop number is greater than "1", and then decrements the hop number by one so as to be "1", and transfers the data to the backup server 900.

In the case of selecting a transfer destination device using the reliability threshold value 66, the control unit 24 refers to the reliability threshold value table 700 for example, and selects a transfer destination device whose reliability level 73 is higher than the reliability threshold value 66 included in the transfer condition information. At such a selection of a transfer destination device, the relay device may acquire a reliability level of another device from outside and select the transfer destination device based on the acquired level. Also, various different methods may be used alternatively. In the case where the value indicated by the reliability threshold value 66 is greater than the predetermined value and a high reliability is demanded of the transfer destination device, the control unit 24 may permit only devices shown in a list of reliable transfer destination devices prestored in the relay device or only devices shown in a list stored in a highly reliable transfer destination device to transfer the transfer data.

Furthermore, in addition to the determination as to whether to permit the transfer, the transfer data may be converted based on the reliability level of each transfer destination device. For example, a predetermined code for tracking the transfer data may be added to the transfer data if the data is to be transferred to a device whose reliability level is smaller than the value indicated by the reliability threshold value 66. The predetermined code is used for finding a device from which the transfer data has been leaked in the case of unauthorized use of the transfer data. For addition of the predetermined code, techniques such as finger printing and digital watermarking may be used. As other processing, if the transfer data is image data, the data size may be reduced by changing the image size. Or else, a filtering procedure such as mosaic processing may be performed on a particular part of the image, or the image may be deleted.

In the case where a device that is not permitted to be a transfer destination is included in the black list 67, the control unit 24 performs control not to select the device, and not to transfer the transfer data to the device.

Again, with reference to FIG. 9, the following further describes the relay device.

Upon selecting the transfer destination device, the relay device controls the transfer of the data based on the result of the selection. In other words, if there is a transfer destination device that satisfies the transfer condition information, the relay device authenticates the selected transfer destination device using the transfer destination authenticating unit 26. If the relay device succeeds in the mutual authentication with the transfer destination device, the relay device transfers the transfer data and the transfer condition information to the transfer destination device via the communication path, using the transmitting unit 27. If there is no transfer destination device that satisfies the transfer condition information, the relay device does not transfer the transfer data (Step S94).

If the address notification necessity 64 included in the received transfer condition information indicates "necessary", the relay device transmits, when receiving the transfer data, the predetermined data that indicates that the transfer data has been received to the address of the information terminal device at the transmission source, or to the address of the backup device as the transfer destination of the data. The predetermined data includes the address of the relay device that has received the transfer data. If the predetermined data is transferred to the address of the backup device, even in the case where the user loses the information terminal device, the user can collect the data to be backed up by inquiring the relay device at the address received by the backup device.

The relay device also controls transfer and storage of transfer data in accordance with each of the transfer deadline 61, the data keeping deadline 62 and the deletion deadline 63, which are indicated by the transfer condition information. Also, each relay device may confirm integrity of the transfer data before storing the received data. To confirm the integrity, the relay device may use a well-known technique. For example, the relay device may add electronic signature to the transfer data and verify the signature. Since the electronic signature is a well-known technique, the explanation thereof is omitted here.

The operations performed by the relay device are described above. The following more specifically explains the operations by taking the mobile phone 200 as an example.

To receive data transmitted by the mobile phone 100, the mobile phone 200 authenticates the mobile phone 100 as the transmission source, using the transmission source authenticating unit 21.

If the mutual authentication with the mobile phone 100 succeeds, the mobile phone 200 receives the data transmitted by the mobile phone 100 via the communication path 20, using the receiving unit 22 (Step S91).

The transfer data included in the data received by the mobile phone 200 is stored by the storing unit 23 (Step S92).

Here, in this embodiment, it is assumed that a user 2 who is an owner of the mobile phone 200 connects the mobile phone 200 to the backup server 200 also owned by the user 2. The communications between the backup server 300 and the mobile phone 200 are realized by the techniques discloses by Patent Documents 1 and 2 for example, by which the communications with the backup server 300 begin when the mobile phone 200 is connected to the battery charger. And here, it is assumed that the backup server 300 satisfies the transfer condition information. In the example of this embodiment, the control unit 24 selects the backup server 300 as the transfer destination device that satisfies the transfer condition information, in accordance with the transfer condition information (Step S93).

Upon selecting the backup server 300 to be the transfer destination device, the control unit 24 authenticates the backup server 300 using the transmission authenticating unit 26. If the mutual authentication with the backup server 300 succeeds, the control unit 24 transmits the transfer data and the transfer condition information to the backup server 300 via the communication path 30, using the transmitting unit 27 (Step S94).

Note that the backup server 300 is capable of communicating with the backup server 900, into which the data is backed up by the user 1 as the owner of the mobile phone 100, via the communication path 90. Therefore, in Step S93, the control unit 24 selects the backup server 900 as the transfer destination device, and in Step S94, transfers the data to the backup server 900.

<Operations of Backup Device>

The following describes operations performed by the backup device.

Figure 10:
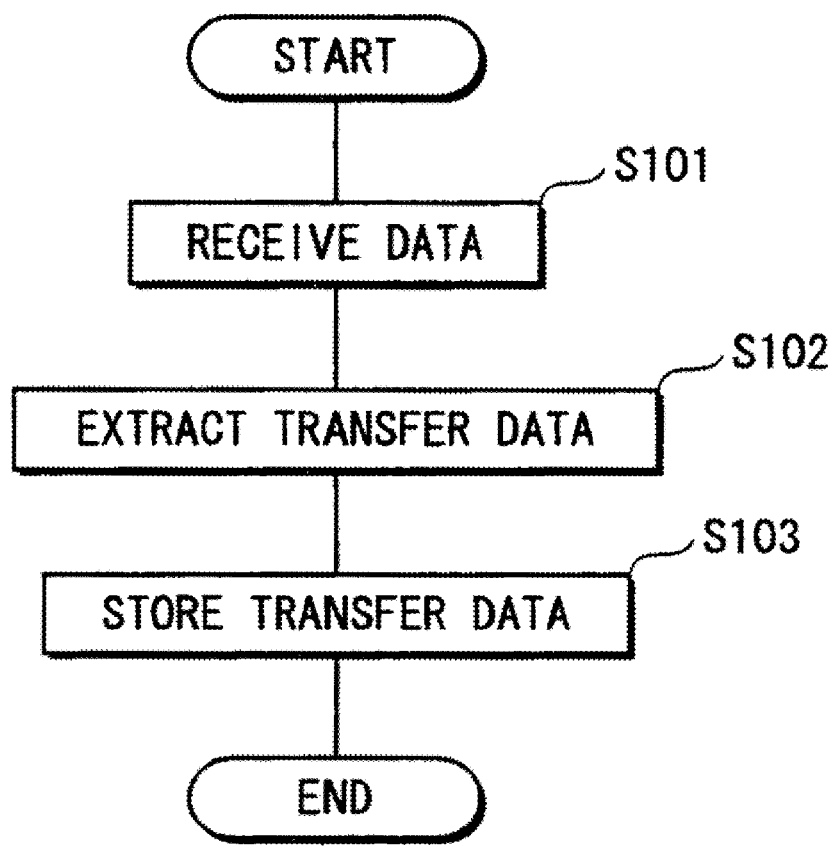
FIG. 10 is a flowchart showing operations performed by a backup device.

FIG. 10 is a flowchart showing operations performed by the backup server 900 as the backup device.

For receiving data, the backup server 900 authenticates the transmission source device, using the transmission source authenticating unit 91. If the mutual authentication with the transmission source device succeeds, the backup server 900 receives the data via the communication path, using the receiving unit 92 (Step S101).

The backup server extracts transfer data from the received data, using the data extracting unit 93 (Step S102).

Upon extracting the transfer data, the backup server 900 stores the extracted data in the storing unit 94 (Step S103).

<Applications>

In this example, the data of the information terminal device is transferred to the backup device. However, the present invention is not limited to this embodiment, and various applications are possible.

In the example above, only one pathway via the communication path 20, the communication path 30, and the communication path 90 is described as the pathway for the backup. However, in addition to this pathway, another pathway via the communication path 21, the communication path 31 and the communication path 91 shown in the same drawing may be used for the backup via the mobile phone 201 and the backup server 301. By using a plurality of pathways to back up the data by the aid of the relay devices, it becomes possible to more certainly transmit the data to the backup device. For example, if identical copies of the data are transmitted via a plurality of paths at the same time, even if the collection of the data fails as to any of the paths, it is possible to collect the data from the rest of the paths. Therefore, the backup of the data can be more surely performed.

To more surely realize the privacy protection, it is preferable that the transfer data is transferred via a communication path that is predictable by the information terminal device. As a result, it becomes possible to reduce the risk of leakage of the transfer data to a communication path that is unknown to the user of the information terminal device. For this reason, the transfer destination authenticating unit of each of the information terminal device and the relay device may select at least one from previously-registered transfer destinations. Or, reliability levels may be set for each device and stored previously, and a device with the highest reliability level may be selected by priority among devices satisfying the transfer condition information.

Also, regarding a relay device that directly communicates with the information terminal device and receives the data first, the conditions indicated by the transfer condition information may not be applied. This is because, in the case where the information terminal device directly communicates with the relay device, the information terminal device already recognizes which of the devices is the transfer destination device, and the user of the information terminal device does not suffer disadvantage relating to privacy protection. Here, "not applying the transfer condition information" means, specifically, that the information terminal device ignores the blacklist 67 and the reliability threshold value 66, and transmits the data. In addition to this, various cases can be assumed. For example, the hop number 65 may not be decreased. Also, the address may not be notified even if the address notification necessity indicates "necessary".

Also, it can be assumed that the privacy is different for each piece of the transfer data. For example, image data including an image of a person has a high value especially for the person as the object. Therefore, the information terminal device and the relay devices may choose a different pathway for each piece of the transfer data. For example, to transfer a certain piece of data by the aid of users particularly relating to the data, the data is transferred by the mobile phone 200 and the backup server 300 via the communication path 20, the communication path 30, and the communication path 90. On the other hand, another piece of data is transferred by the mobile phone 201 and the backup server 301 via the communication path 21, the communication path 31 and the communication path 91, instead of the pathway including the communication path 20 and so on.

To strengthen the privacy protection, one piece of a transfer data may be divided into more than two pieces, and each piece of data may be transferred via a different pathway. The backup device can combine the pieces of data each received via the different pathway, to obtain the original data to be backed up. In this way, dividing the original data can prevent that the original data is restored using the pieces of data. As a method for dividing data into more than two pieces, the Threshold Secret Sharing Scheme may be used, for example. If this method is used, even if some of the pieces of data are lost in the course of the transfer, it is possible for the backup device to restore the original data as long as the number of existing pieces of data is more than the threshold value relating to the secret sharing.

Meanwhile, as a method for selecting a piece of data to be backed up, in addition to the example described in the explanation of the operations performed by the information terminal device, the data to be backed up may be selected in such a manner that only data generated after the previously-performed backup is selected. Also, if the data to be backed up is images, it is possible to select, by priority, an image including a person as an object. Furthermore, it is possible to add an execution priority to each piece of data stored in the storing unit 12 of the information terminal device, and the pieces of data are selected in the order of the execution priority level by the backup image selecting unit 13. Also, the priority may be determined based on various types of information, such as necessity of the backup, importance of the data, whether the data has been already backed up or not, and the time length elapsed from the backup performed the last time. For example, a piece of data that has not ever been backed up may be given a priority over a piece of data that has been backed up recently.

The backup image selecting unit 13 can select, as data to be backed up, not only the data acquired by the image acquiring unit 11 and stored in the storing unit 12, but also every piece of data acquired by the mobile phone 100. For example, it may be data acquired via a network or medium such as a recording medium, or music data or movie data, or a commercial content distributed by a content provider and acquired by the mobile phone 100. In the above-described embodiment, since an example of backing up data acquired by the user is explained, the transfer condition information is explained as including information for protecting privacy relating to the transfer data. However, in the case of backing up a commercial content, the transfer condition information indicates conditions to be satisfied for execution of the transfer, and it may be determined by the content provider. Note that the object of the present invention might not be the backup of the data. In other words, the object may be to simply transfer data to another device by the aid of the relay devices that relays the data.

Also, in the above-described embodiment, the relay device judges whether to delete the transfer data in accordance with each of the transfer deadline 61, the data keeping deadline 62 and the deletion deadline 63. However, the present invention is not limited to this. The relay device may delete the transfer data stored therein when receiving a predetermined signal from another device such as the backup device. Such a signal may be transmitted from said another device when said another device stores the transfer data. This enables the relay device to confirm that the relay device can delete the transfer data. Therefore, it becomes unnecessary for the relay device to endlessly keep the transfer data.

In the above described embodiment, when the information terminal device begins, the backup is not particularly limited. The backup may be started at a user's instruction, or may be performed periodically. Also, the execution of the backup may be automatically prepared when a predetermined time elapses from the time when the backup was performed the last time, and then performed immediately after a transfer destination device is found. Furthermore, a predetermined condition may trigger the preparation for execution of the backup. For example, the preparation may start when the user passes through the gate of his house, or when an amount of data that has not been backed up reaches a predetermined amount.

In addition to the above-described embodiment, to ensure the privacy protection, the information terminal device and the relay device may encrypt the data to be backed up before starting the transmission, to reduce the risk that the data is referred from outside. This encryption may be performed every time the transfer is performed, and may be performed using a public key of the backup device. Also, signature data or authentication code (Message Authentication Code) may be added to the data at the time of the transmission. It is possible to use public key cryptography for this signature as well. As a result, it becomes possible to confirm that the data in the backup device is not tampered or counterfeited.

The relay device may transfer received data to another device without change, or may change codec, if the data is image data or moving picture data, or perform compensation, or change the size or the bit rate before transferring the data. Also, the relay device may add a digital watermark or information for tracking the data to the data before transferring the data.

Note that a term "backup" generally means to transmit a copy of the data to be backed up to the backup device with keeping the original data in the information terminal device. However, regarding the present invention, the information terminal device may delete the data to be backed up stored in the storing unit 12 after transmitting the data. As a result, even in the case where the remaining capacity of the storage area is small, it is possible to make space for storing data.

Second Embodiment

Figure 11:
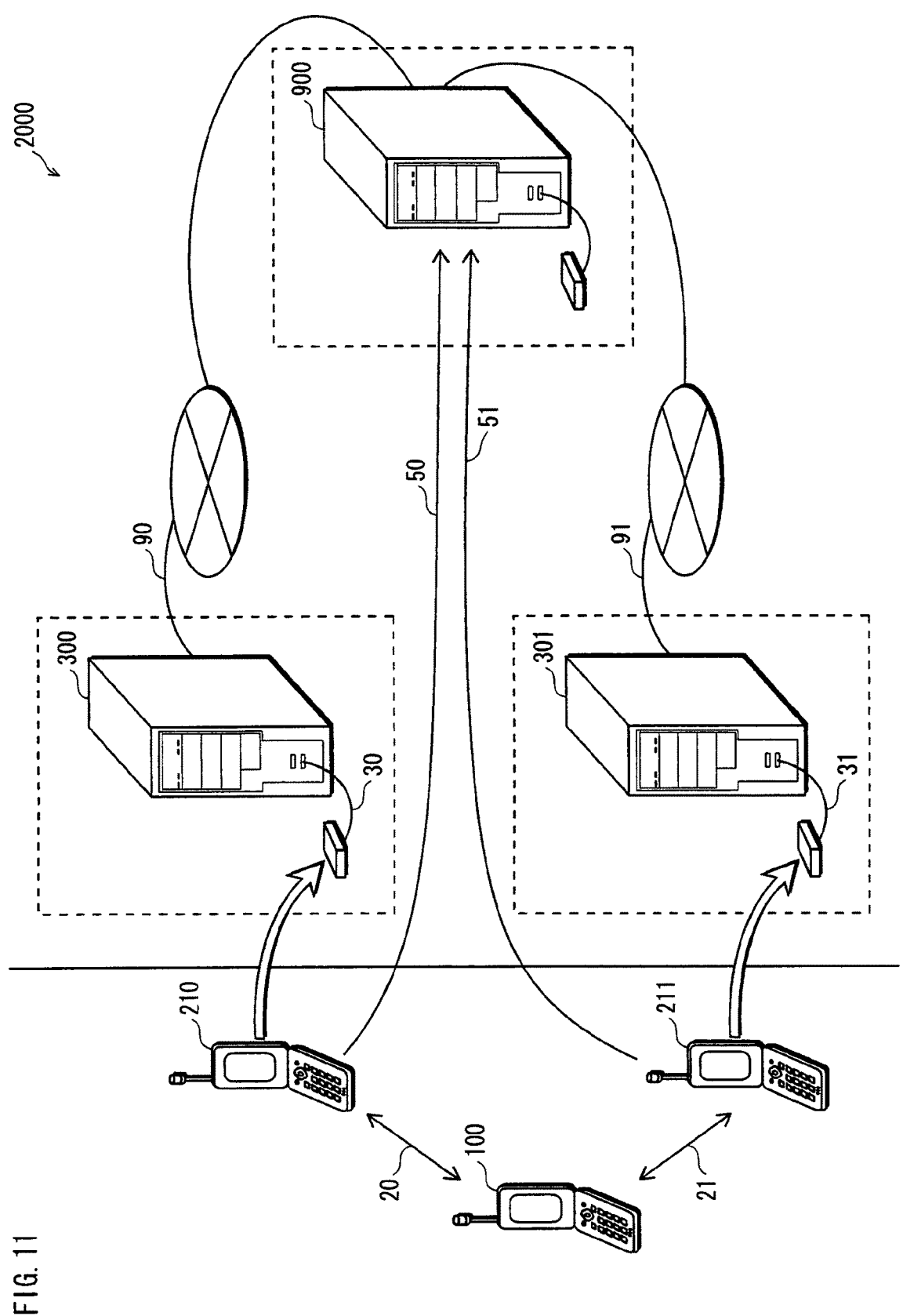
FIG. 11 shows an overall structure of a backup system 2000 according to the second embodiment of the present invention.

The following describes another embodiment of the backup system according to the present invention, with reference to the drawings.
<Overview>
FIG. 11 shows an overall structure of a backup system 2000 according to the second embodiment of the present invention.

The second embodiment is different from the first embodiment in that the relay devices such as a mobile phone 210 and a mobile phone 211, having substantially the same structure as the mobile phone 200 and the mobile phone 201, do not transfer data when receiving the data from the mobile phone 100 as the information terminal device, and instead, transmits exchange information indicating which relay device stores the transfer data to a backup server 900 as the backup device via a communication path 50 and a communication path 51. The mobile phone 210 and the mobile phone 211 are connected to the backup server 900 via the communication path 50 and the communication path 51 respectively. Here, it is assumed that the communication path 50 and the communication path 51 are telephone lines for example, and their communication speeds are lower than that of the broadband network.

As a result, even if the user of the information terminal device looses the information terminal device, it is possible to collect the backup data by specifying the relay device that stores the backup data based on the exchange information received by the backup device, and having the relay device transfer the data.

The following mainly describes the differences from the first embodiment.

<Structure>

The structure of the information terminal device is the same as the first embodiment. Therefore, an explanation thereof is omitted here, and the structure of the relay device is described next.

Figure 12:
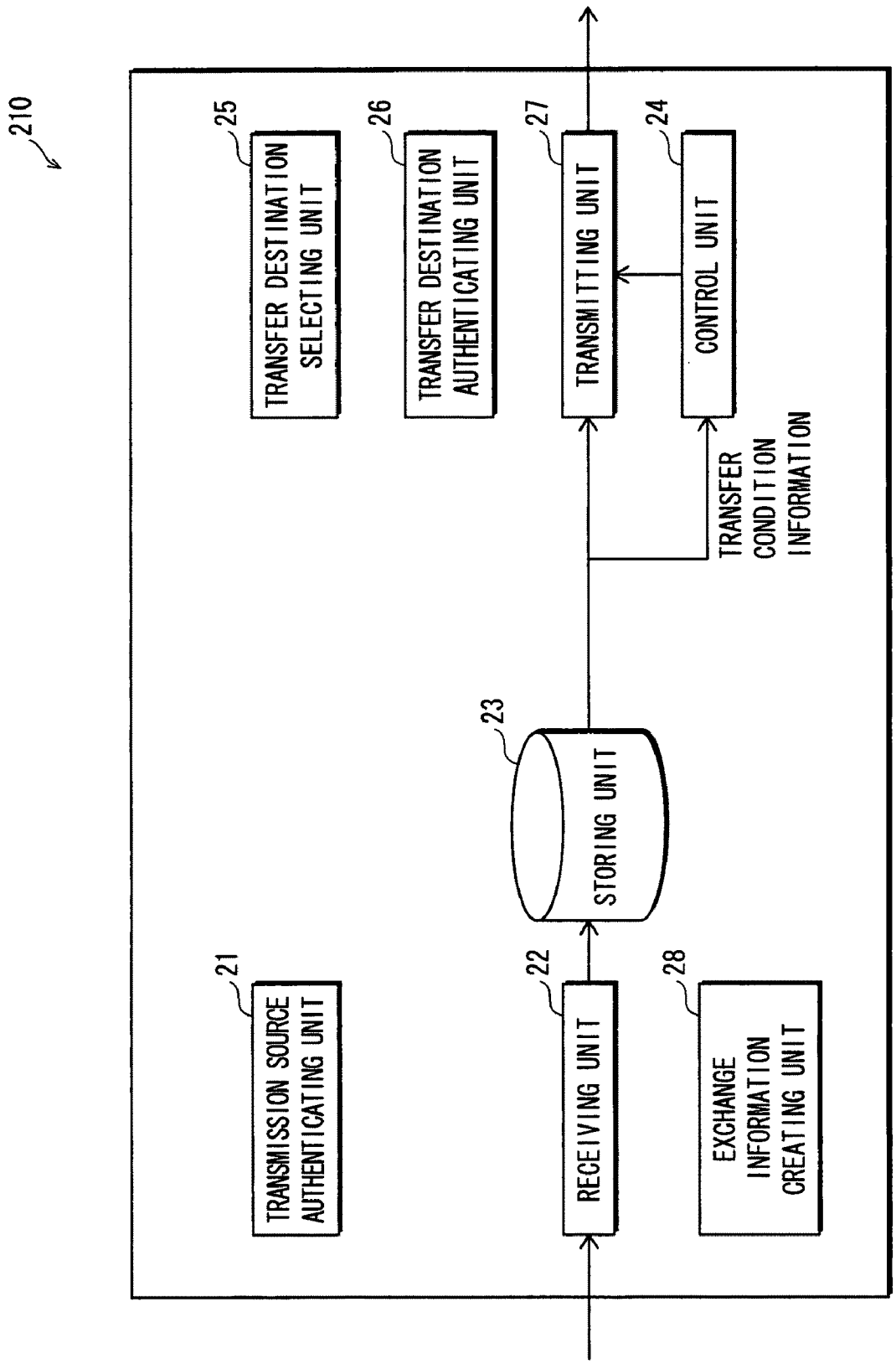
FIG. 12 is a functional block diagram of a mobile phone 210 according to the second embodiment.

FIG. 12 is a functional block diagram of a mobile phone 210 according to the second embodiment.

As FIG. 12 shows, the mobile phone 210 includes an exchange information creating unit 28, which is not included in the mobile phone 200 of the first embodiment. The components other than the exchange information creating unit 28 are the same as the components of the mobile phone 200. Therefore, the same reference numbers are given to those components, and explanations thereof are omitted here.

When the data transmitted from the information terminal device is received by the receiving unit 22 and stored in the storing unit 23, the exchange information creating unit 28 creates the exchange information indicating which relay device stores the transfer data. The exchange information is described later. The exchange information creating unit 28 transmits the created exchange information to the backup device which is the final transfer destination of the received data.

The structure of the mobile phone 211 is the same as the mobile phone 210. Therefore, an explanation thereof is omitted here.

The backup server 900 as the backup device receives, using the receiving unit 92, the exchange information transmitted by the mobile phone 210 via a communication path, and stores the received exchange information in the storing unit 94.

<Data>

The following describes the exchange information.

FIG. 13 shows exchange information 1300. Note that FIG. 13 shows an example of the exchange information to be transmitted by the mobile phone 210 as the relay device to the backup server 900 in the case where the data to be backed up is transmitted by the mobile phone 100 to the mobile phone 210.

As FIG. 13 shows, the exchange information 1300 includes backup source identifying information 131, keeping device identifying information 132, a backup data ID 133, a backup data amount 134, a keeping period 135, and a signature 136.

The backup source identifying information 131 includes an ID of information terminal device that performs the backup, and an address of the information terminal device. In the sample shown in FIG. 13, the backup source identifying information 131 indicates that the ID of the information terminal device is "Hanako001" and the address of the information terminal device is "123.456.789.001".

The keeping device identifying information 132 indicates an ID of the relay device that has received the data from the information terminal device and stores the data, and the address of the relay device. In the example shown in FIG. 13, the keeping device identifying information 132 indicates that the ID of the relay device is "Musashi005" and the address of the relay device is "456.789.012.345".

The backup data ID 133 is information for identifying data backed up by the information terminal device, and indicates the name of the data. In the example shown in FIG. 13, the backup data ID 133 indicates two names, namely "Photo1.jpg" and "Photo2.jpg", as data names.

The backup data amount 134 indicates the data amount of the data backed up by the information terminal device. In the example shown in FIG. 13, the data amount is "5 MB".

The keeping period 135 indicates a period for which the relay device keeps the data to be backed up. In the example shown in FIG. 13, the relay device keeps the data for four months from Nov. 1, 2004 to Mar. 1, 2005.

The signature 136 indicates that the exchange information 1300 has been created by the relay device that stores the data. The signature is generated by an RSA signature method and so on, using the private key of the relay device.

<Operations>

The following describes operations performed by each relay device. Operations performed by the information terminal device are the same as those of the first embodiment. Therefore, an explanation thereof is omitted here.

Figure 14:
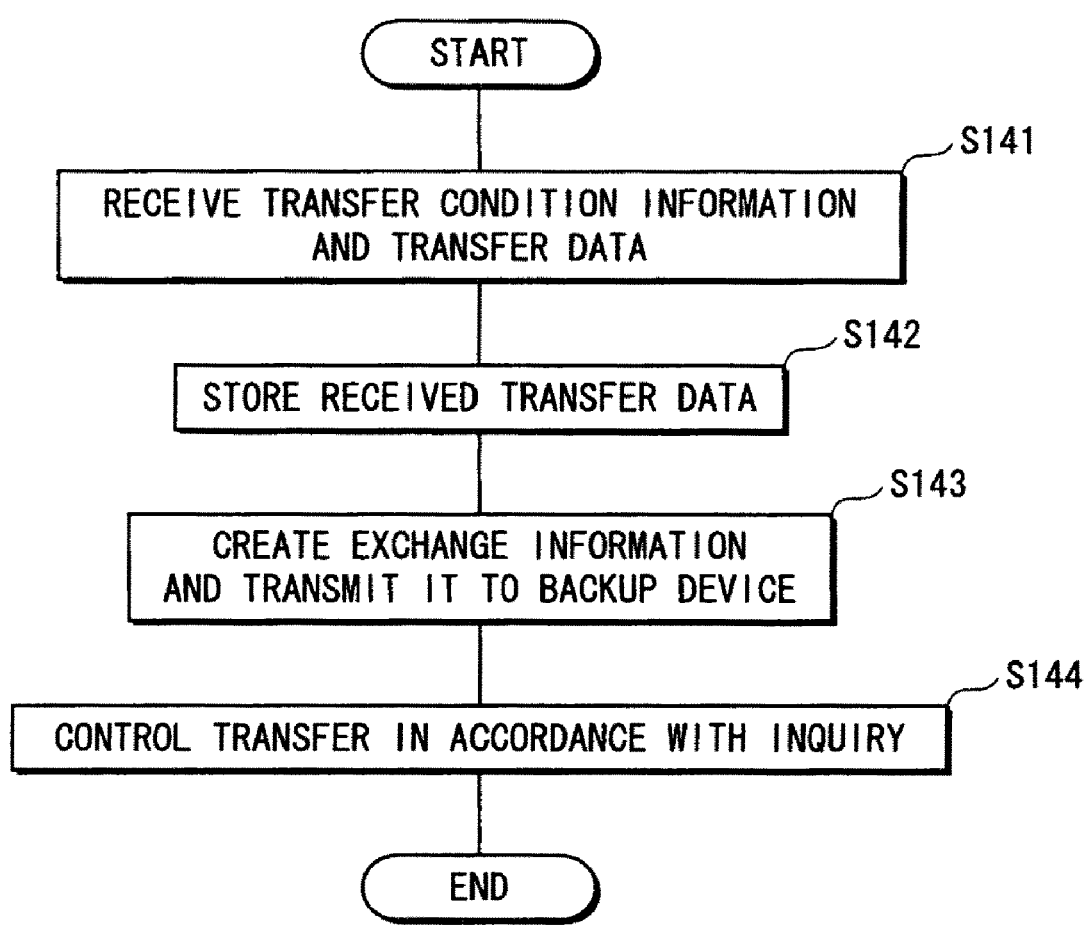
FIG. 14 is a flowchart showing operations performed by a relay device according to the second embodiment.

FIG. 14 is a flowchart showing operations performed by the relay device according to the second embodiment. In the example of FIG. 14, the case where the relay device is the mobile phone 210 is explained. Note that the backup device is the backup server 900.

Step S141 is for the same processing as Step S91 shown in FIG. 9, and Step S142 is for the same processing as Step S92. Therefore, explanations thereof are omitted here.

When the transfer data is stored in the storing unit 23 by the processing in Step S142, the exchange information creating unit 28 creates exchange information, and transmits the created exchange information to the backup server 900 via a communication path 50 (Step S143).

After transmitting the exchange information, if the relay device receives an inquiry as to the transfer data from the backup server 900, the relay device starts transfer of the transfer data to the backup server 900 (Step S144). If the relay device does not receives an inquire as to the transfer data from other devices such as the backup server 900, the relay device keeps or deletes the transfer data stored in the storing unit 23, in accordance with the period shown by the keeping period 135.

Note that the size of the exchange information is smaller than image data and so on. Therefore, even if the exchange information is transmitted to the backup server 900 via a low-speed communications line such as the communication path 50, load on the line and the cost is low.

Meanwhile, upon receiving the exchange information via the communication path 50, the backup server 900 stores the received exchange information in the storing unit 94.

If the user of the information terminal device that backs up the data in the backup server 900 loses the information terminal device, the user requests the relay device that stores the transfer data to transfer the transfer data based on the exchange information stored in the backup server 900, and collects the data. The method used for collecting the data is, for example, a method using an IP address for using a network, or a method using a medium such as a memory card.

In the second embodiment above, the relay device transmits the created exchange information to the backup device. However, the present invention is not limited to this. The relay device may transmit the exchange information to a device other than the backup device, such as the information terminal device. If this is the case, the user of the information terminal device may keep the received exchange information in a removable medium or the like. This means that the user can keep the substation information separately from the information terminal device. Also, the exchange information may be transmitted from the information terminal device to the backup device.

Third Embodiment

The following describes a backup system according to the third embodiment.
<Overview>
The third embodiment is characterized by that when a mobile phone transmits data to be backed up to another device, the mobile phone also receives data to be backed up from the transfer destination device.

Here, the both devices transmit and receive transmission/reception condition information to and from each other, and judge whether to perform mutual backup based on the transmission/reception condition information.

Figure 15:
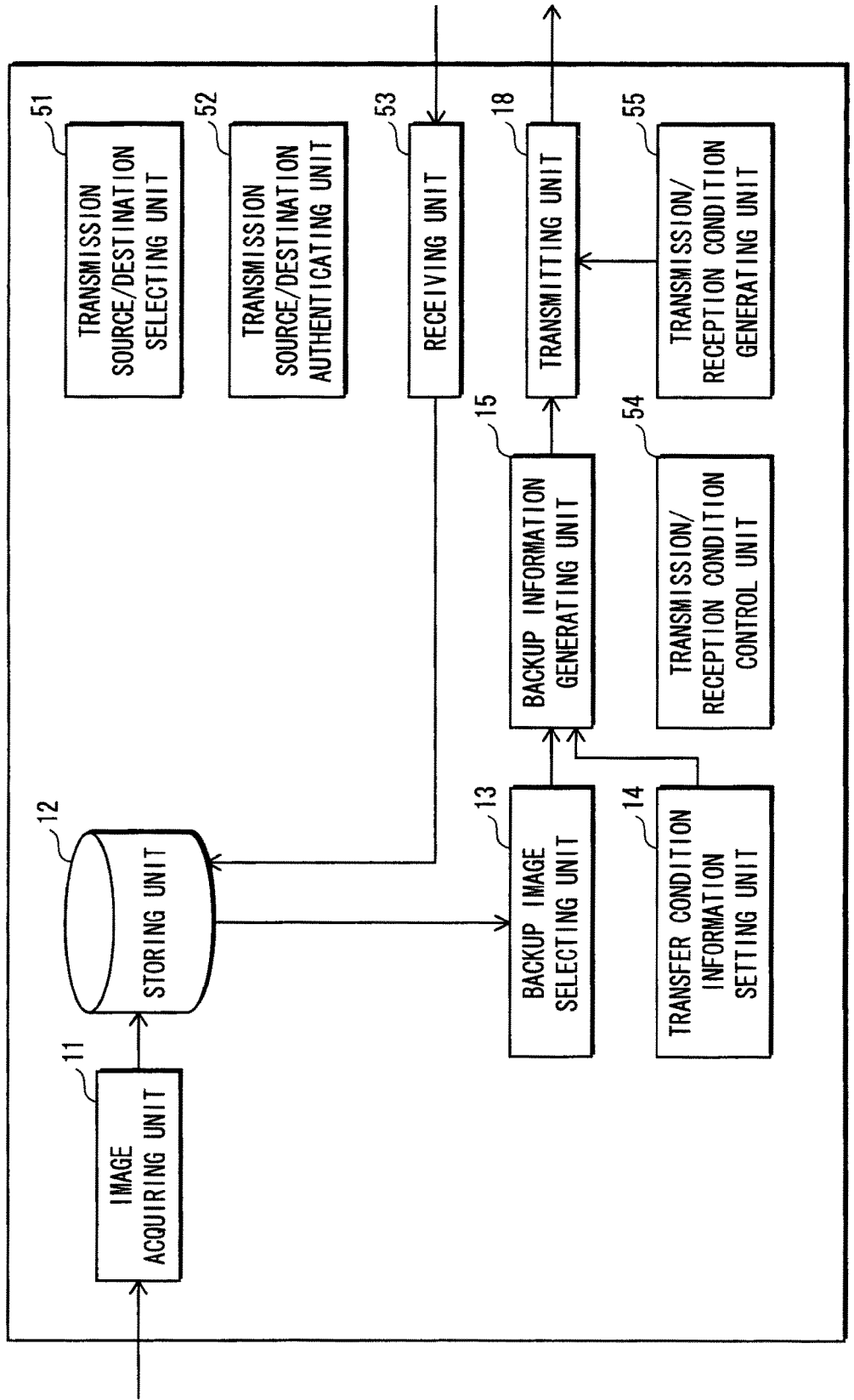
FIG. 15 is a functional block diagram of a mobile phone 500 having a mutual backup function.

With this structure, it is possible to prevent that only one of the devices occupies the storage of the other device to back up data, and the devices can perform mutual backup under a fair condition. The following describes, as an example, a case where mobile phones perform such mutual backup.
<Structure>
FIG. 15 is a functional block diagram of a mobile phone 500 which has a function of performing mutual backup. In this embodiment, it is assumed that the mobile phone 500 and a mobile phone having the same structure as the mobile phone 500 perform the mutual backup.

As FIG. 15 shows, the mobile phone 500 includes an image acquiring unit 11, a storing unit 12, a backup image selecting unit 13, a transfer condition information setting unit 14, a backup information generating unit 15, a transmitting unit 18, a transmission source/destination selecting unit 51, a transmission source/destination authenticating unit 52, a receiving unit 53, a transmission/reception condition control unit 54, and a transmission/reception condition generating unit 55.

The image acquiring unit 11, the storing unit 12, the backup image selecting unit 13, the transfer condition information setting unit 14, and the backup information generating unit 15 are the same as those of the mobile phone 100 in the first embodiment. Therefore, explanations thereof are omitted here.

The transmitting unit 18 has a function of transmitting data. For example, the transmitting unit 18 transmits data to be backed up, transmission/reception condition information that relates to the data to be backed up by the mobile phone 500 itself, and so on.

The transmission source/destination selecting unit 51 selects a mobile phone that performs the mutual backup.

The transmission source/destination authenticating unit 52 authenticates a mobile phone that performs the mutual backup.

The receiving unit 53 receives the data transmitted from the mobile phone as the party of the mutual backup, or the transmission/reception condition information transmitted from the party.

The transmission/reception control unit 54 controls the mutual backup with the mobile phone as the party, based on the transmission/reception condition information that relates to the data that is to be backed up by the mobile phone 500 itself and the transmission/reception condition information that is transmitted from the mobile phone as the party of the mutual backup.

The transmission/reception condition generating unit 55 generates the transmission/reception condition information that relates to the data to be backed up by the mobile phone 500 itself.
<Data>
The following describes the transmission/reception condition information.

FIG. 16 shows the transmission/reception condition information. In the example of FIG. 16, a transmission condition 1600*a* represents transmission/condition information that relates to data to be backed up by the mobile phone 500 itself. A reception condition 1600*b* represents information that relates to the data to be backed up by the party of the mutual backup. In this embodiment, whether to execute the mutual backup is judged based on the transmission/reception condition information transmitted by the mobile phone 500 itself and the transmission/reception condition information received from the party of the mutual backup.

As FIG. 16 shows, a data amount 161*a* included in the transmission condition 1600*a* indicates an amount of data to be backed up by the mobile phone 500 itself.

A recording method 162*a* indicates how the data to be backed up by the mobile phone 500 should be recorded by the mobile phone as the party. In the example shown in FIG. 16, "double recoding" means that the data should be recorded at two locations.

A keeping deadline 163*a* indicates a deadline until which the backup data is desired to be kept. In the example shown in FIG. 16, the mobile phone as the party is desired to keep the data for four months until Mar. 1, 2005.

A data amount 161*b* included in the reception condition 1600*b* indicates an amount of data to be backed up by the mobile phone as the party.

A recording method 162*b* indicates how the data to be backed up by the mobile phone as the party should be recorded by the mobile phone 500.

Figure 17:
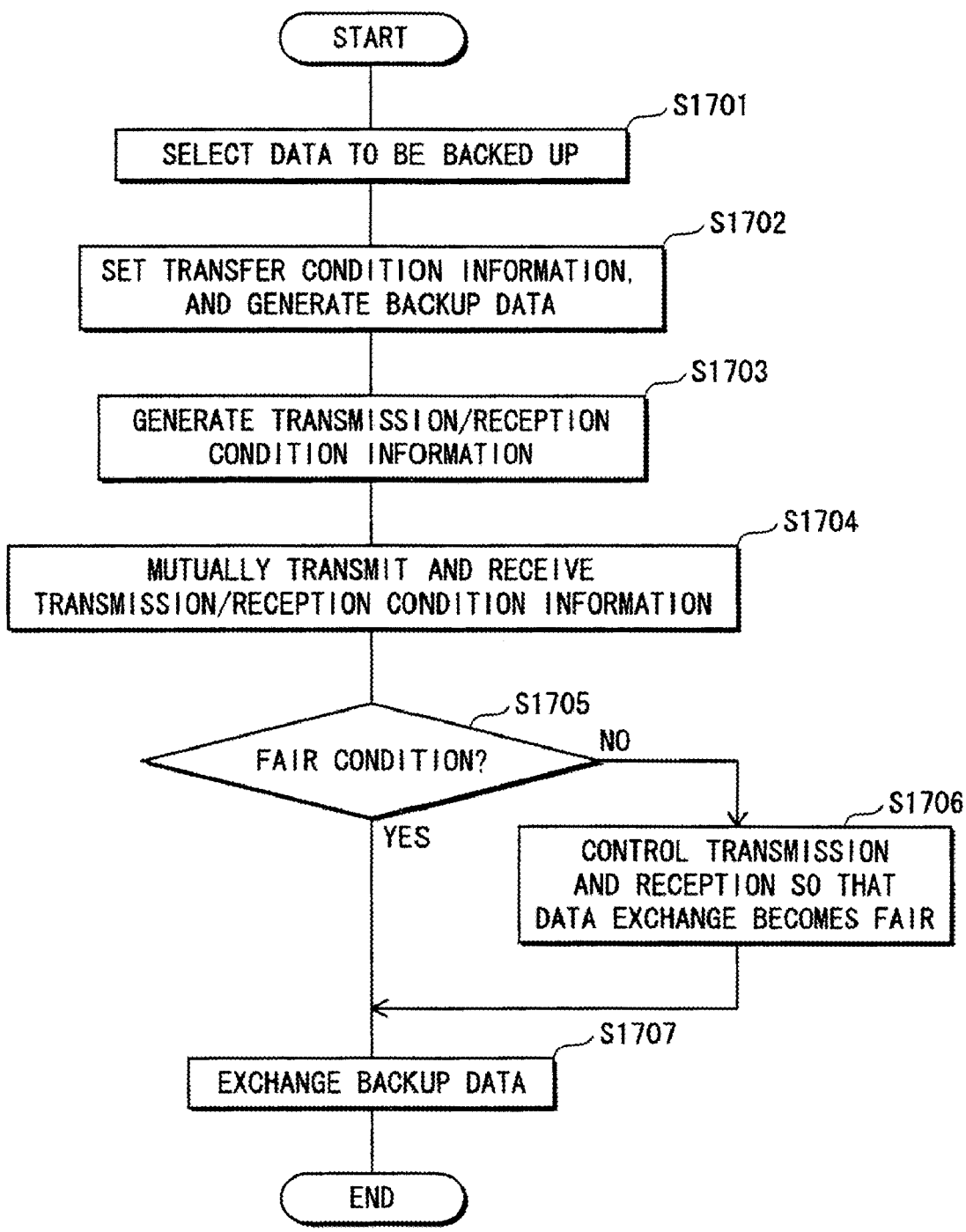
FIG. 17 is a flowchart showing operations of mutual backup performed by an information terminal device and another device.

A keeping deadline 163*b* indicates a deadline until which the backup data to be backed up by the party is desired to be kept by the mobile phone 500. In the example shown in FIG. 16, the mobile phone 500 is desired to keep the data for two months until Jan. 1, 2005.
<Operations>
FIG. 17 is a flowchart showing operations performed by the information terminal device and another device for the mutual backup. The example shown in FIG. 17 describes the operations up to the exchange of the backup data performed by the mobile phone 500 and the mobile phone as the party. The operations for the transfer of the data to the backup device performed after the data is exchanged are the same as that of the relay device in the first embodiment. Therefore, the explanations thereof are omitted here.

As shown in FIG. 17, the mobile phone 500 selects data to be backed up, using the backup image selecting unit 13 (Step S1701). Regarding the selected data, the mobile phone 500 sets the transfer condition, using the transfer condition setting unit 14, and generates data to be transmitted to another device, using backup information generating unit 15 (Step S1702).

After generating data to be transmitted, the mobile phone 500 generates the transmission/reception condition information relating to the data to be backed up (Step S1703). More specifically, the mobile phone 500 generates the transmission condition 1600a shown in FIG. 16. On the other hand, the mobile phone as the party generates the reception condition 1600b shown in FIG. 16.

After both devices have generated the transmission/reception condition information, the mobile phone 500 transmits the transmission condition 1600a using the transmitting unit 18, and receives the reception condition 1600b using the receiving unit 53 (Step S1704).

After exchanging the transmission/reception conditions, the transmission/reception condition control unit 54 digitizes the transmission/reception condition, and judges whether the transmission/reception conditions are fair to both phones (Step S1705).

As a method for the digitization, it is possible to digitize the condition by calculating "required memory amount×period". In the example of FIG. 16, according to the transmission condition 1600a transmitted by the mobile phone 500, the value of the digitized transmission/reception condition is "5 MB×double recording×four months=40". On the other hand, according to the transmission condition 1600b received from the mobile phone as the party, the value of the digitized transmission/reception condition is "20 MB×single recording×2 months=40". In this way, if the exchanged transmission/reception conditions are digitized to the same value, the transmission/reception condition control unit 54 judges that the backup is fair (Step S1705: YES).

If judging that the backup is not fair, based on the digitized transmission/reception conditions (Step S1705: NO), the transmission/reception control unit 54 controls the transmission/reception of data so that the mutual backup becomes fair (Step S1706). For example, the size of the data to be backed up by the mobile phone 500 is 10 MB, the value of the digitized transmission condition is "10 MB×double recording×4 months=80". This is not equal to the value calculated by digitizing the reception condition 1600b. Therefore, the transmission/reception control unit 54 judges that this mutual backup is not fair. In this case, the transmission/reception control unit 54 sets 40 MB as the amount of data that the mobile phone 500 receives from the mobile phone as the party. As a result, the value calculated by digitizing the transmission/reception condition information of the mobile phone as the party is "40 MB×single recording×2 months=80", which means that this transmission/reception condition is fair.

After the transmission/reception condition control unit 54 has finished the control, the mobile phone 500 exchanges the backup data with the mobile phone as the party (Step S1707).

The above is the backup system according to the third embodiment However, the present invention is not limited to this, and various applications are possible.

For example, in the above-described example, Step S1705 of FIG. 17 is explained that the transmission/reception conditions exchanged between the mobile phone 500 and the party are digitized, and if the values are the same, the transmission/reception condition control unit 54 judges that the backup is fair. However, the transmission/reception condition control unit 54 may judge that the backup is fair not only in the case where the values are the same, but also the case where the difference between the values is less than a predetermined threshold value, or, for example, the case where one of the values is not smaller than 70% and not more than 130% of the other value, to relax the criterion for the judgment.

Also, in the above-described embodiment, the mutual backup is started when the transmission/reception conditions are regarded as being fair. However, even if the transmission/reception conditions are regarded as being fair, if the mobile phone as the party does not satisfy the condition indicated by the transfer condition information, the mutual backup may not be permitted. This prevents data exchange with an undesired party.

Also, in the example above, if the values calculated by digitizing the transmission/reception conditions are not the same, the difference is controlled in Step S1706 such that the transmission/reception conditions become fair, or if the difference is within a certain range, the condition is regarded as being fair. However, the present invention is not limited to this. For example, the difference may be converted to a right or a voucher that can be used for executing backup the next time. If this is the case, the right or the voucher may be used for mutual backup not with the mobile phone as the party with which the right or the voucher is generated.

Furthermore, the difference may be converted to valuable information or an incentive not relating to execution of the backup. For example, the difference may be converted to value information having a cash value, such as electronic money and points. Also, it may be converted to a right to use processing power or calculation power of other devices, or a right to use a bandwidth broader than other devices, or a right to view a commercial content such as moving pictures.

In addition to the above-described embodiments, the present invention also includes a structure in which both devices store the data to be backed up mutually without using the transfer condition information.

Also, in the explanation of Step S1703, regarding the method used by the transmission/reception condition generating unit 55 to generate the transmission/reception condition information, it is described that the transmission/reception condition generating unit 55 generates the transmission/reception condition information shown in FIG. 16. However, the transmission/reception condition information may be generated based on a user's input, or automatically generated based on information relating to the data to be backed up, such as the data amount.

Also, the transmission/reception condition information may further include conditions relating to a recording medium that stores the backup data, such as a reliability of a medium that stores the backup data, or a security level of a storage medium.

<Supplemental Description>
(Other Modifications)

The present invention is described based on the embodiments above. However, the present invention is not limited to this. The following are possible modifications.

(1) The above-described embodiments explain cases where the information terminal device is a mobile phone. However, the present invention is not limited to this. The information terminal device may be a communication device having a communication function. The communication device is, for example, a PDA (Personal Digital Assistance), a personal computer or a palm top.

(2) Each of the above-described devices is specifically a computer system structured from a microprocessor, a ROM, a RAM, a hard disk unit, a display unit, a keyboard, a mouse, and so on. A computer program is stored on the RAM or the hard disk unit. Each device carries out functions as a result of the microprocessor operating in accordance with the computer program. Here, a computer program is structured by a combination of a plurality of instruction codes for instructing a computer to achieve predetermined functions.

(3) Part or all of the components structuring the information terminal device, the relay device, and the backup device may be a single system LSI (Large Scale Integration). The system LSI is a super-multifunctional LSI, which is manufactured by integrating a plurality of components on a signal chip, and specifically is a computer system structured by a microprocessor, a ROM, a RAM and so on. A computer program is stored on the RAM. The system LSI carries out functions as a result of the microprocessor operating in accordance with the computer program. Each system LSI may be separately realized as a single chip, or part or all of the System LSI may be realized as a single chip. Note that though LSI is used here, the circuit may be variously described as an IC, a system IC, a super LSI or an ultra LSI depending on the level of integration.

Note also that the technique used to make an integrated circuit is not limited to the LSI technique. A special-purpose circuit or a general-purpose processor may be used instead. It is also possible to use LSI circuits such as the programmable FPGA (Field Programmable Gate Array) whose configurations can be altered after production or a reconfigurable processor whose circuit cell connections and settings are configurable.

Moreover, if a technology to replace LSI emerges due to progress in the field of semiconductor technology or due to the derivation of another technology, such a technology may be used to integrate the functional block. The use of biotechnology, and the like is considered to be a possibility.

Further, the present invention may be the above-mentioned computer program and the digital code recorded onto a recording medium. Examples of such recording media include, a flexible disk, a hard disk, a CD-ROM, a MO, a DVD, a DVD-ROM, a DVD-RAM, a BD (Blu-ray Disc), a semiconductor memory and the like.

Further, the present invention may be realized such that the computer program and the digital code are transmitted across telecommunications networks, wired and wireless, such as the Internet and the like.

Further, the present invention may be a computer system having a microprocessor and a memory, the memory holding the above-mentioned computer program and the microprocessor performing operations according to the computer program.

(5) The present invention may include various combinations of the embodiments and the modifications.

The backup system according to the present invention is particularly useful for performing backup in an environment where mobile communication devices such as mobile phones are used.

The invention claimed is:

1. A backup system for backing up data from a first information terminal device by transferring the data to be backed up to a first backup device via at least a second information terminal device, the backup system comprising:
   the first backup device;
   the first information terminal device; and
   the second information terminal device,
   wherein the first information terminal device includes:
      a storing unit operable to store the data to be backed up; and
      a communication unit operable to transmit, to the second information terminal device, the data to be backed up and transfer condition information (i) indicating a condition set by a user of the first information terminal device and to be satisfied by at least the second information terminal device that transfers the data to be backed up, and (ii) relating to a protection of the data to be backed up,
   wherein the second information terminal device includes:
      a device information storing unit including a physical memory storing device information, such that the device information stored in the physical memory is related to a plurality of candidate devices, and such that each of the plurality of candidate devices is a candidate for being a transfer destination of the data to be backed up;
      a receiving unit operable to receive, from the first information terminal device, the data to be backed up and the transfer condition information; and
      a transfer control unit operable to (i) select, from the plurality of candidate devices and as the first backup device, a device that satisfies the condition indicated by the received transfer condition information, and (ii) transfer the received data to be backed up in accordance with the selected first backup device, such that the transfer control unit transfers the received data to be backed up according to the condition set by the user of the first information terminal device, even when the first information terminal device is not able to directly write the data to be backed up into the first backup device,
   wherein the receiving unit of the second information terminal device further receives a transfer deadline and a deletion deadline,
   wherein, when the receiving unit of the second information terminal device receives the transfer deadline, the transfer control unit of the second information terminal device transfers the received data to be backed up, such that the first backup device receives the transferred data to be backed up before the transfer deadline,
   wherein, when the receiving unit of the second information terminal device receives the deletion deadline, the transfer control unit of the second information terminal device deletes the received data to be backed up at the deletion deadline, and
   wherein the first backup device is for backing up the data to be backed up and transferred from the first information terminal device via the second information terminal device and includes:
      a backup data receiving unit operable to receive the data to be backed up and transferred by the transfer control unit of the second information terminal device; and
      a backup data storing unit operable to store the received data to be backed up.

2. The backup system of claim 1,
   wherein the condition, indicated by the transfer condition information, is that a device of the plurality of candidate devices is not identified in a blacklist identifying devices not permitted to be the transfer destination, and
   wherein the transfer control unit selects, from the plurality of candidate devices and as the first backup device, a device that is not identified in the blacklist.

3. The backup system of claim 1,
   wherein the device information includes a reliability level for each of the plurality of candidate devices,
   wherein the transfer condition information indicates a threshold value, of the reliability level for each of the plurality of candidate devices, to be satisfied by the transfer destination, and
   wherein the transfer control unit selects, from the plurality of candidate devices and as the first backup device, only a device that satisfies the threshold value.

4. The backup system of claim 1,
wherein the transfer control unit further includes a conversion processing subunit operable to perform predetermined conversion processing on the received data to be backed up, and
wherein the transfer control unit transfers the received data to be backed up after performing the predetermined conversion processing on the received data to be backed up.

5. The backup system of claim 4, wherein the second information terminal device includes a second transfer control unit operable to transfer the received data, upon which the conversion processing subunit has performed the predetermined conversion processing, to a device of the plurality of candidate devices not satisfying the condition indicated by the transfer condition information.

6. The backup system of claim 4, wherein the predetermined conversion processing performed by the conversion processing subunit includes inserting an identifier of the second information terminal device, as a digital watermark, into the received data.

7. The backup system of claim 1 further including a second backup device for backing up data transferred from the second information terminal device,
wherein the second information terminal device transfers the data received from the first information terminal device to the first backup device via the second backup device.

8. The backup system of claim 7, wherein the second information terminal device further comprises:
an exchange information transmitting unit operable to create and transmit exchange information indicating that the received data to be backed up is stored in the second information terminal device;
a transfer request receiving unit operable to receive, from another device that has received the transmitted exchange information, a request to transfer the received data to be backed up corresponding to the exchange information; and
a third transfer control unit operable to transfer the received data corresponding to the exchange information to the another device, when the transfer request receiving unit receives the request to transfer the received data corresponding to the exchange information.

9. The backup system of claim 8,
wherein, before transmitting the data to be backed up to the second information terminal device, the communication unit transmits first transmission/reception condition information to the second information terminal device, and receives second transmission/reception condition information from the second information terminal device,
wherein the first information terminal device further comprises a judging unit operable to judge whether the first transmission/reception condition information and the second transmission/reception condition information are substantially the same, and
wherein, when the judging unit judges affirmatively, the communication unit transmits the data to be backed up to the second information terminal device.

10. The backup system of claim 9,
wherein the first transmission/reception condition information is associated with transmission data that the first information terminal device transmits,
wherein the second transmission/reception condition information is associated with reception data that the first information terminal device receives from the second information terminal device,
wherein, when the judging unit judges affirmatively, the communication unit transmits the transmission data to the second information terminal device and receives the reception data from the second information terminal device, and
wherein the storing unit stores the received reception data.

11. The backup system of claim 9, wherein each of the first transmission/reception condition information and the second transmission/reception condition information includes at least one of a size of the data to be backed up, a keeping deadline until which the first information terminal device or the second information terminal device keeps the data to be backed up, a recording method for recording the data to be backed up in a recording medium and an incentive for keeping the data to be backed up.

12. The backup system of claim 11, wherein the incentive includes at least one of value information having a cash value, relay device control information indicating a right to have the second information terminal device perform predetermined processing, and viewing right information indicating a right to view a predetermined content.

13. The backup system of claim 9,
wherein the first transmission/reception condition information contains information of an amount of data to be backed up by the first information terminal device, and the second transmission/reception condition information contains information of an amount of data to be backed up by the second information terminal device, and
wherein the judging unit judges whether a value obtained by quantifying the first transmission/reception condition information is the same as a value obtained by quantifying the second transmission/reception condition information.

* * * * *